(12) United States Patent
Kim et al.

(10) Patent No.: US 11,093,040 B2
(45) Date of Patent: Aug. 17, 2021

(54) FLEXIBLE DEVICE AND METHOD OPERATING THE SAME

(71) Applicant: Samsung Electronics Co., Ltd., Suwon-si (KR)

(72) Inventors: Dae-myung Kim, Hwaseong-si (KR); Shi-yun Cho, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 214 days.

(21) Appl. No.: 15/542,475

(22) PCT Filed: Jan. 13, 2016

(86) PCT No.: PCT/KR2016/000327
§ 371 (c)(1),
(2) Date: Jul. 10, 2017

(87) PCT Pub. No.: WO2016/114571
PCT Pub. Date: Jul. 21, 2016

(65) Prior Publication Data
US 2018/0275763 A1    Sep. 27, 2018

(30) Foreign Application Priority Data

Jan. 16, 2015 (KR) .................. 10-2015-0008262

(51) Int. Cl.
*G06F 3/0488* (2013.01)
*G06F 3/01* (2006.01)
(Continued)

(52) U.S. Cl.
CPC ............ *G06F 3/017* (2013.01); *G06F 1/1652* (2013.01); *G06F 1/1694* (2013.01);
(Continued)

(58) Field of Classification Search
CPC .... G06F 1/1652; G06F 3/0338; G06F 1/1694; G06F 3/04883; G06F 3/04845; G06F 3/0481; G06F 3/017; G06F 2200/1614
See application file for complete search history.

(56) References Cited

U.S. PATENT DOCUMENTS 8,485,426 B2   7/2013   Cohen et al.
8,963,833 B2   2/2015   Yu
(Continued)

FOREIGN PATENT DOCUMENTS

CN   103176735 A   6/2013
CN   103384284 A   11/2013
(Continued)

OTHER PUBLICATIONS

European Search Report dated Apr. 6, 2020; European Appln. No. 16 737 535.1-1203.
(Continued)

*Primary Examiner* — Towfiq Elahi
(74) *Attorney, Agent, or Firm* — Jefferson IP Law, LLP

(57) ABSTRACT

A flexible device includes: a display that may be bent by an external force; a sensor configured to sense at least one motion from the group consisting of a bending motion and a folding motion of the flexible device; and a controller configured to determine outer form information about the flexible device, which is obtained when the flexible device is deformed by the at least one motion, and control an object in a screen, displayed on the display, to be moved based on the outer form information.

15 Claims, 17 Drawing Sheets

(51) Int. Cl.
*G06F 3/0484* (2013.01)
*G06F 1/16* (2006.01)
*G06F 3/0481* (2013.01)
*G06F 3/0338* (2013.01)

(52) U.S. Cl.
CPC .......... *G06F 3/0338* (2013.01); *G06F 3/0481* (2013.01); *G06F 3/04845* (2013.01); *G06F 3/04883* (2013.01); *G06F 2200/1614* (2013.01)

(56) References Cited

U.S. PATENT DOCUMENTS

| | | |
|---|---|---|
| 9,436,311 B2 | 9/2016 | Park et al. |
| 9,829,969 B2 | 11/2017 | Yang et al. |
| 2011/0227822 A1* | 9/2011 | Shai ................ G06F 1/1656 345/156 |
| 2013/0293455 A1 | 11/2013 | Yang et al. |
| 2013/0300732 A1* | 11/2013 | Hosoya ............ G06F 1/1652 345/419 |
| 2013/0335311 A1 | 12/2013 | Kim |
| 2014/0078047 A1* | 3/2014 | Seo ................ G06F 3/0487 345/156 |
| 2014/0101560 A1 | 4/2014 | Kwak et al. |
| 2014/0141841 A1 | 5/2014 | Yeo et al. |
| 2016/0132179 A1* | 5/2016 | Bostick ............ G06F 3/04815 345/419 |
| 2016/0306390 A1* | 10/2016 | Vertegaal .......... G06F 1/1666 |

FOREIGN PATENT DOCUMENTS

| | | |
|---|---|---|
| CN | 103389861 A | 11/2013 |
| EP | 2 709 091 A2 | 3/2014 |
| KR | 10-2010-0015231 A | 2/2010 |
| KR | 10-2013-0050628 A | 5/2013 |

OTHER PUBLICATIONS

Chinese office action dated Jul. 2, 2019; Application #: 201680010324.0; Issuing #: 2019062701846730.
European Office Action dated Jan. 25, 2021, issued in European Patent Application No. 16737535.1-1203.
Korean Office Action dated Mar. 24, 2021, issued in Korean Patent Application No. 10-2015-0008262.

* cited by examiner

[Fig. 1]
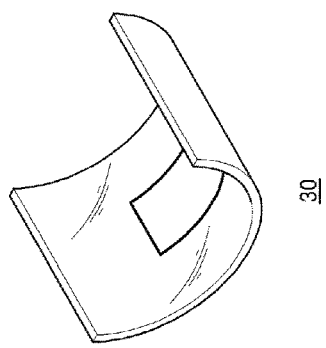
30
20
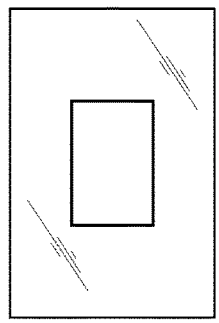
10
[Fig. 2]
200
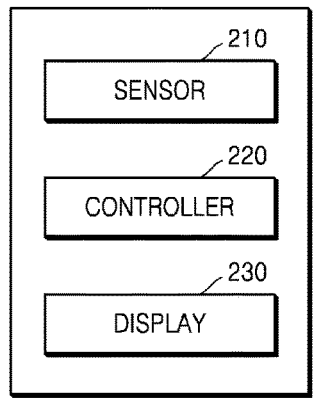

[Fig. 3]
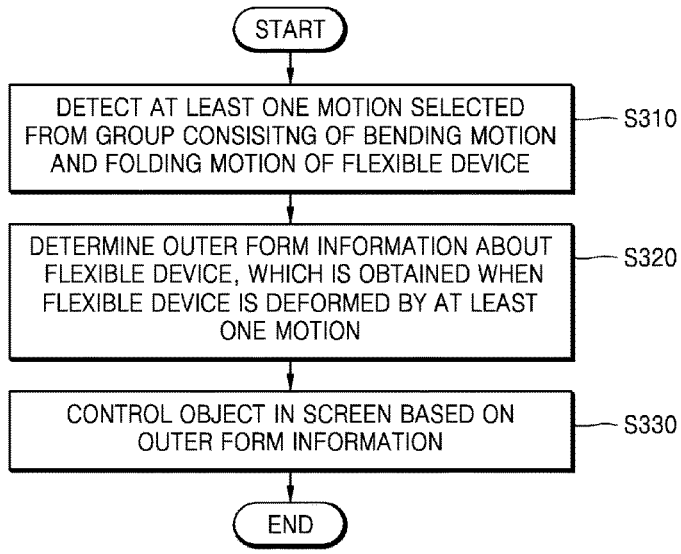
[Fig. 4]
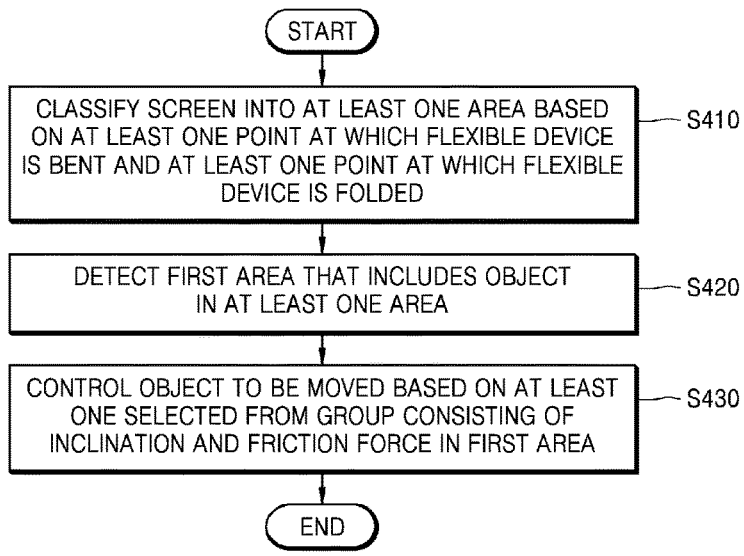
[Fig. 5]
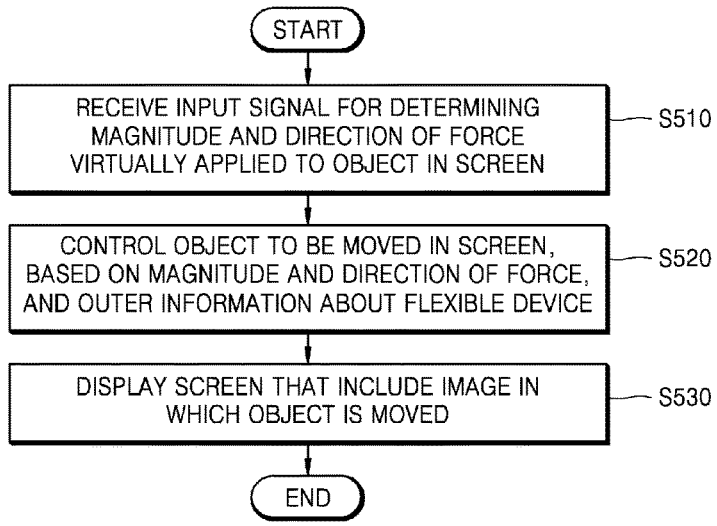

[Fig. 6]
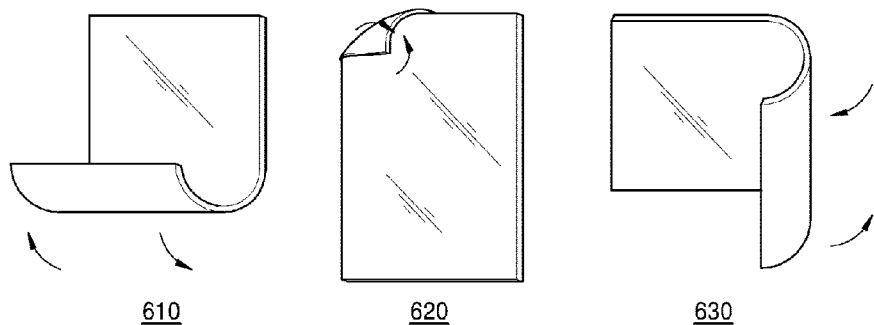
610  620  630
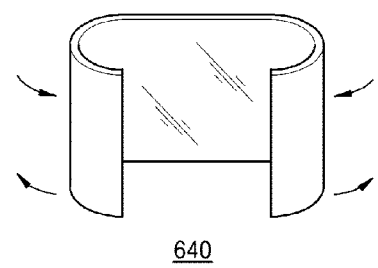
640
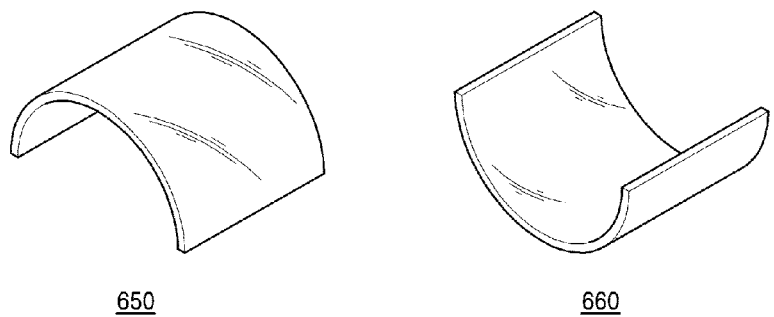
650  660

[Fig. 7]
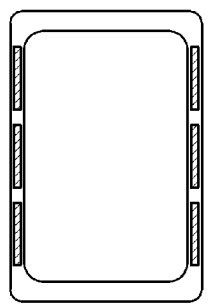
710
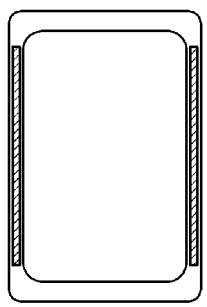
720
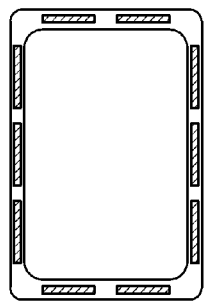
730
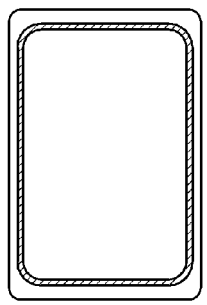
740
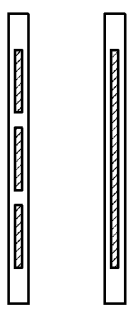
750

[Fig. 8]
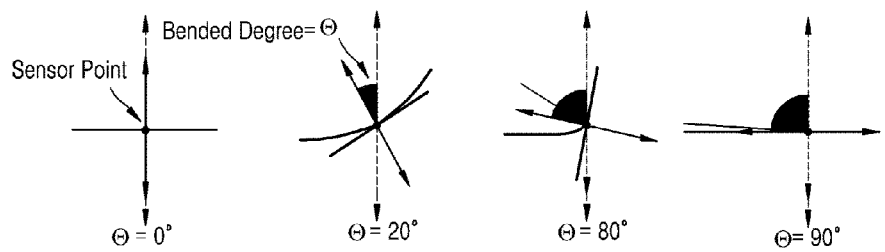
810
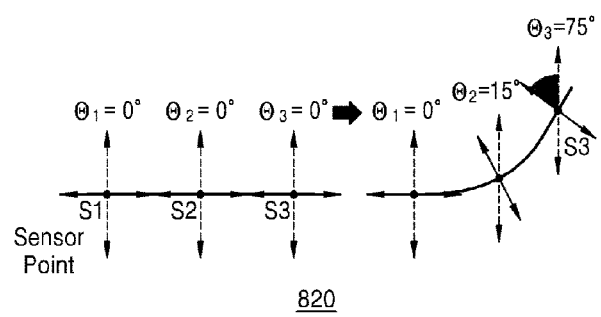
820
[Fig. 9]
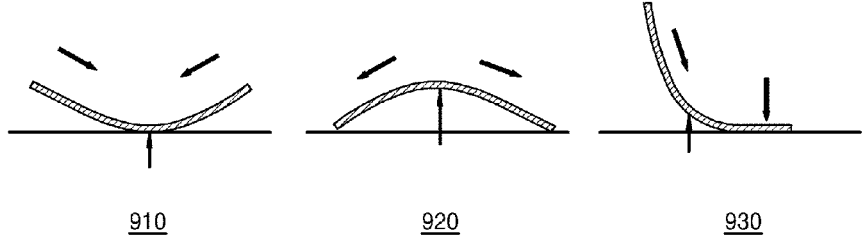
910     920     930

[Fig. 10a]
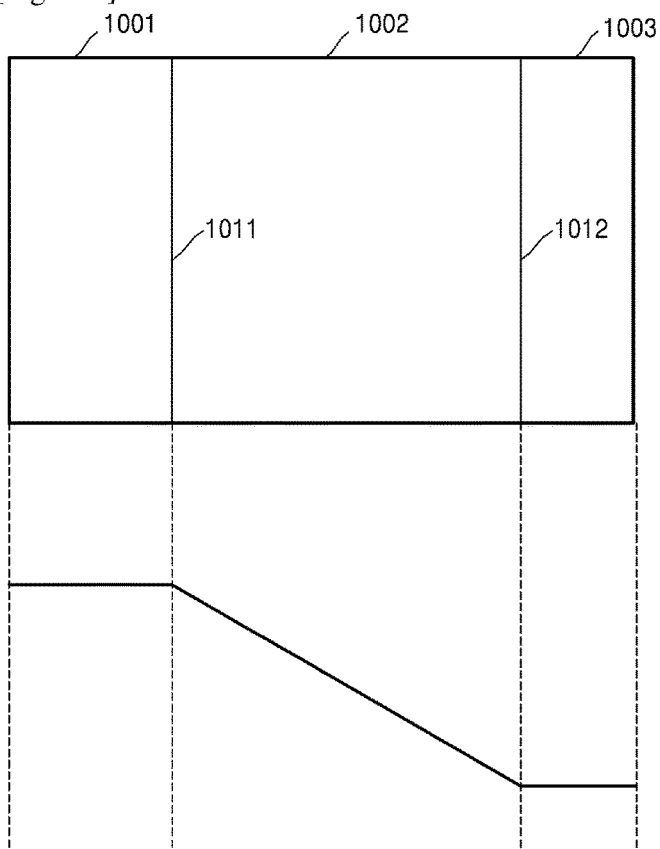
[Fig. 10b]
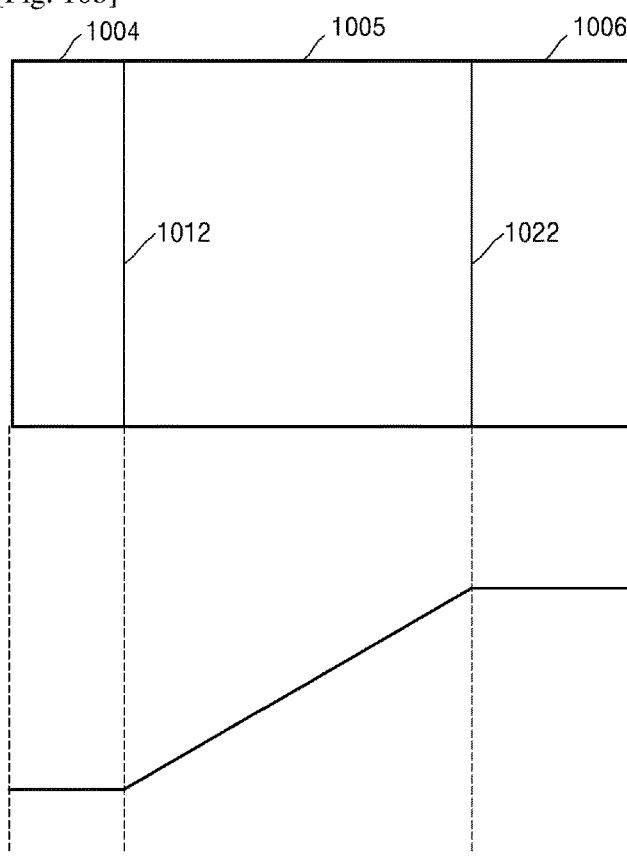

[Fig. 11a]
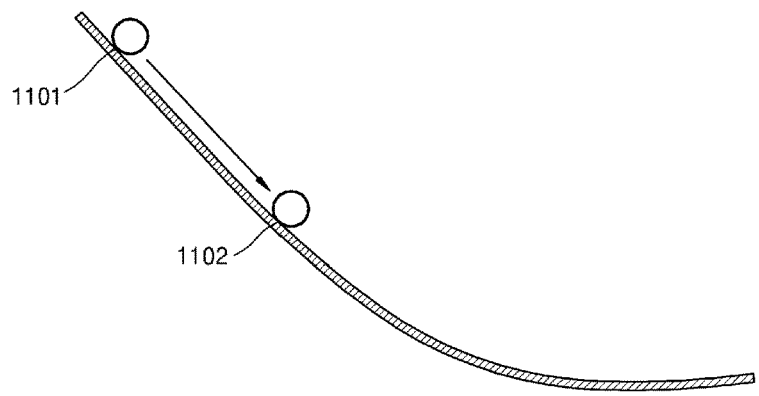
[Fig. 11b]
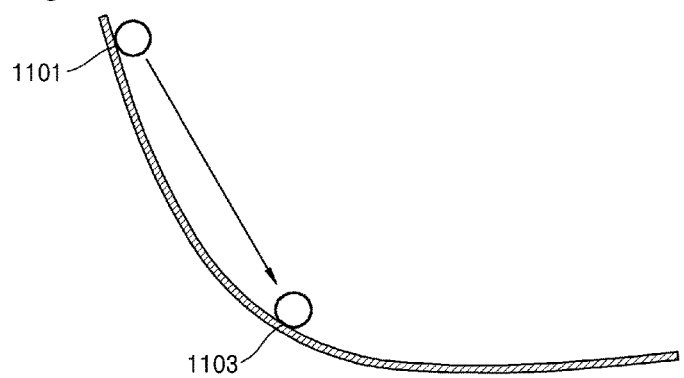
[Fig. 12a]
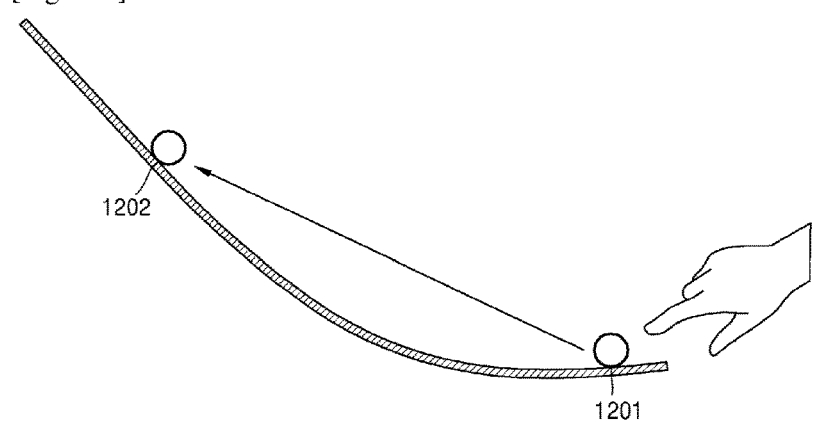
[Fig. 12b]
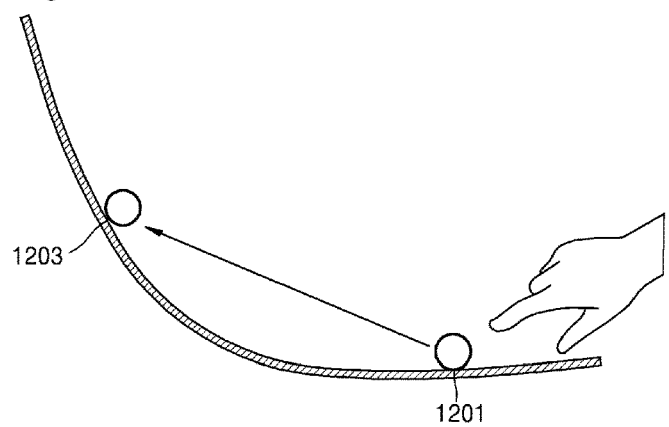

[Fig. 13a]
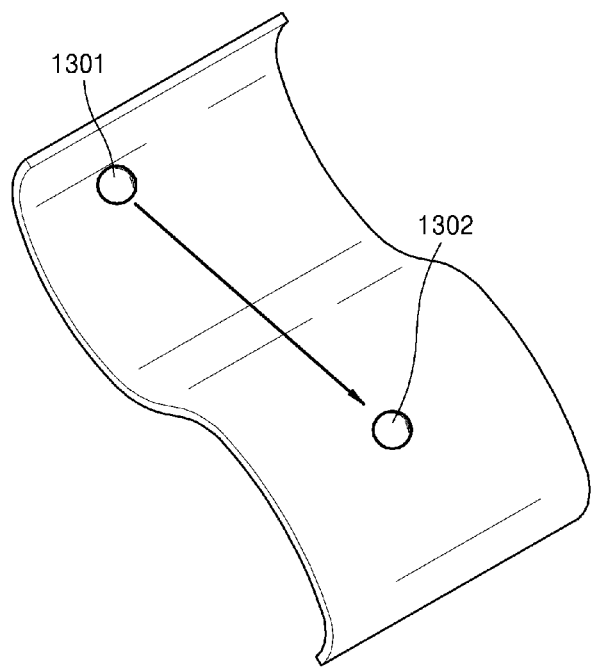
[Fig. 13b]
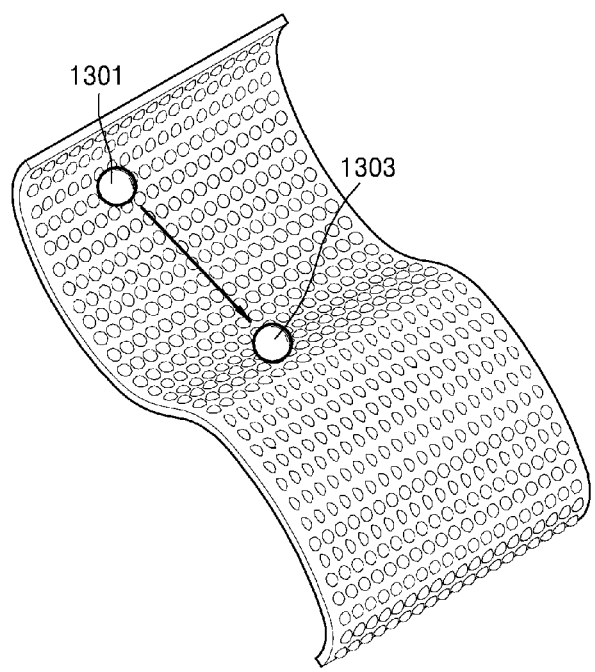

[Fig. 14a]
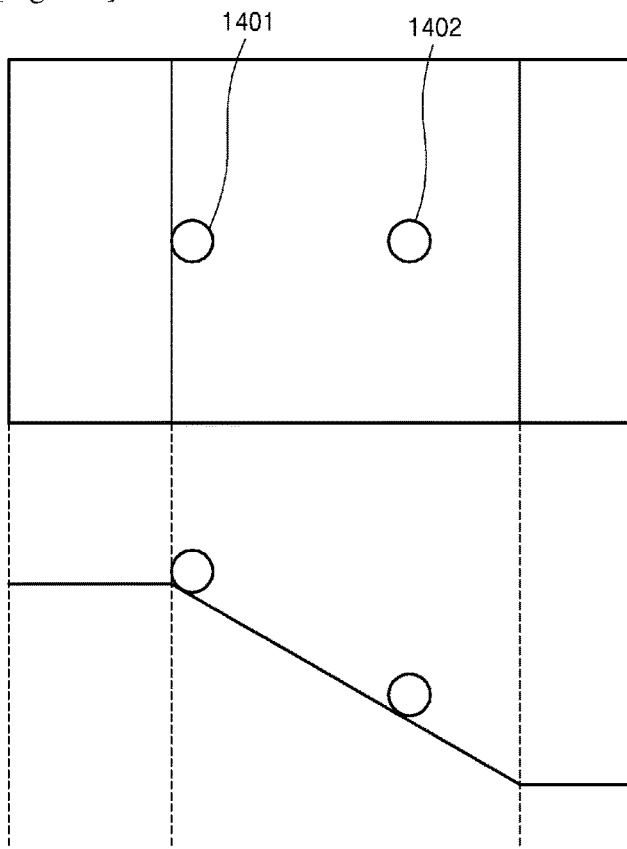
[Fig. 14b]
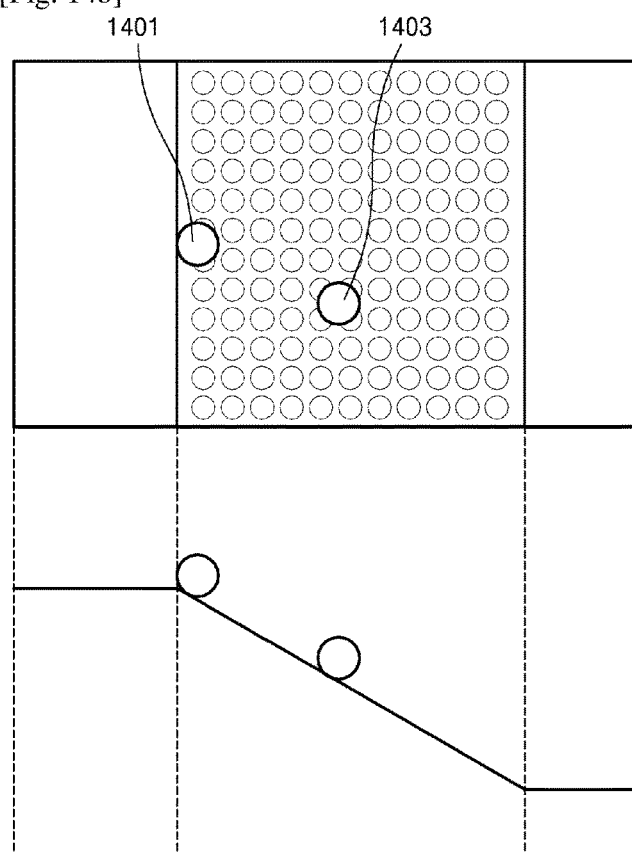

[Fig. 15]
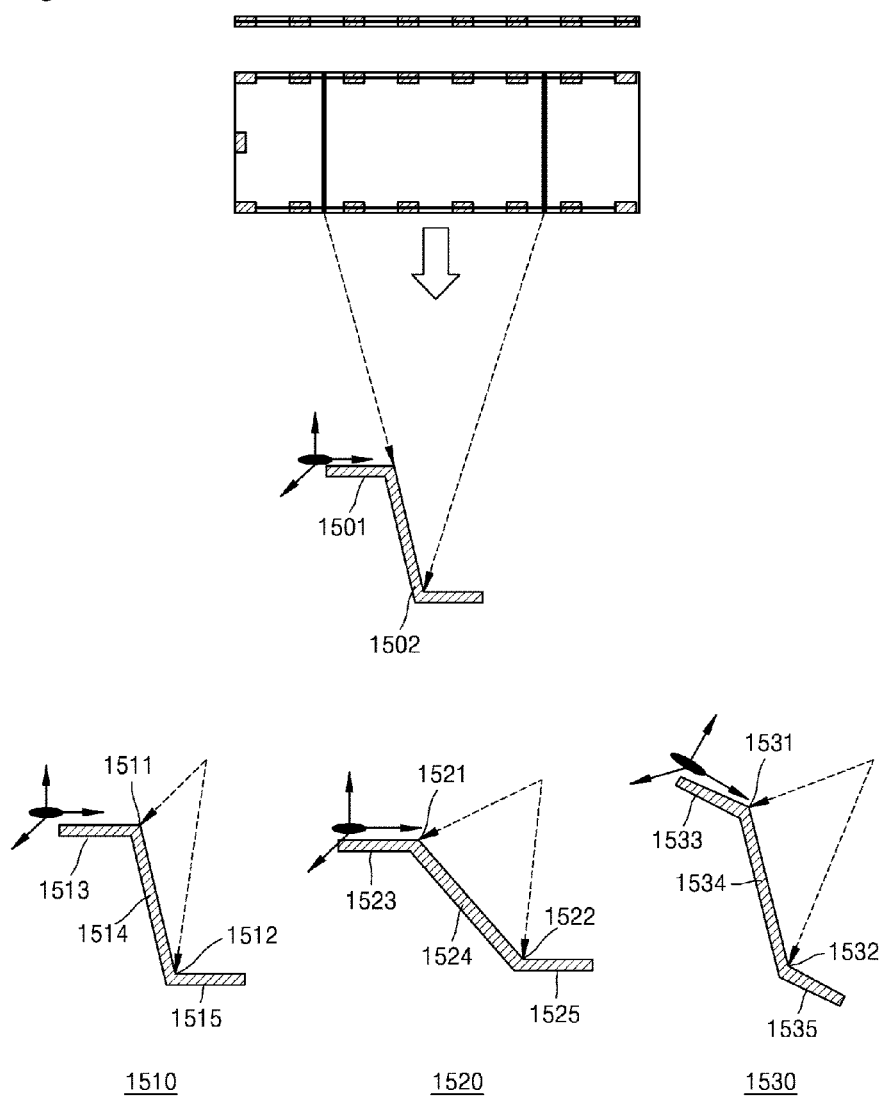

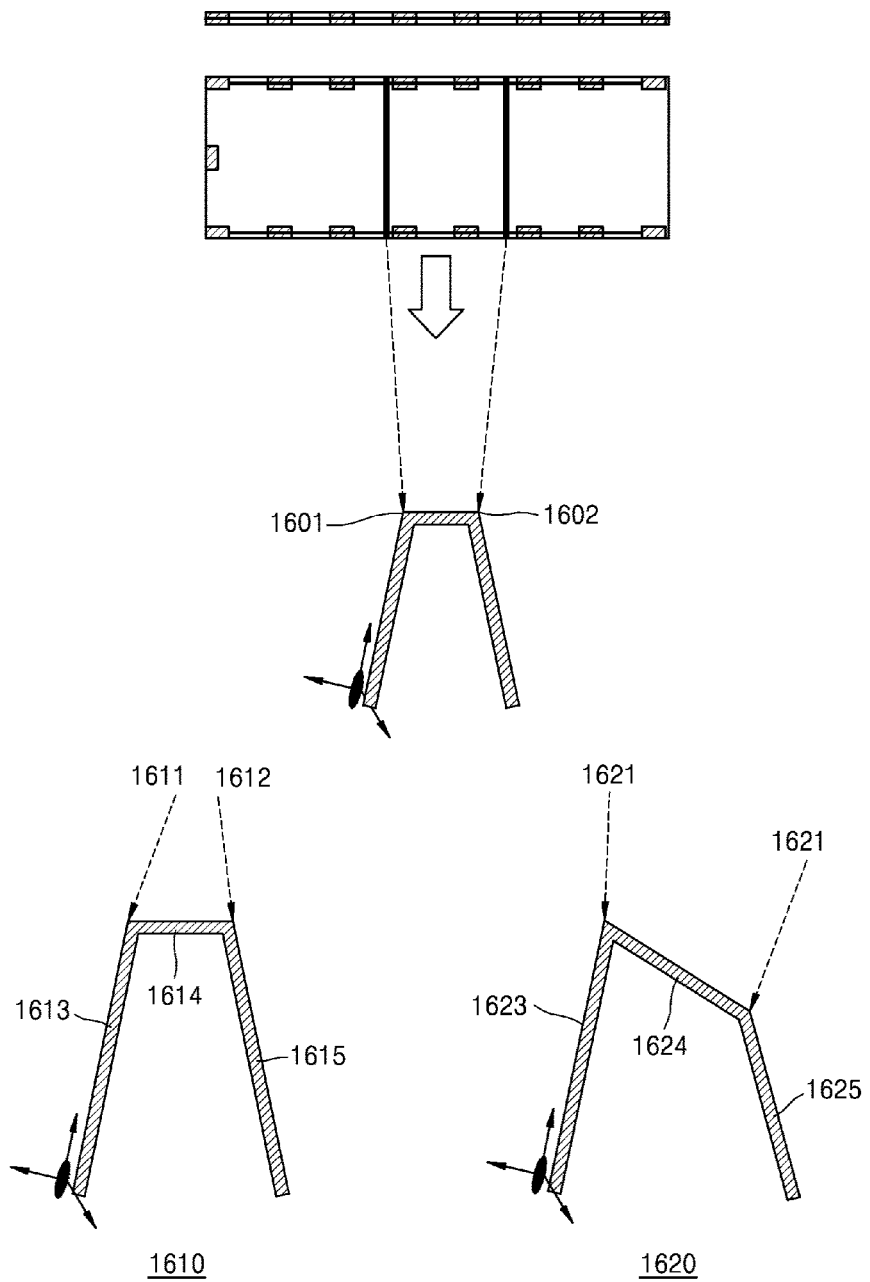
[Fig. 16]

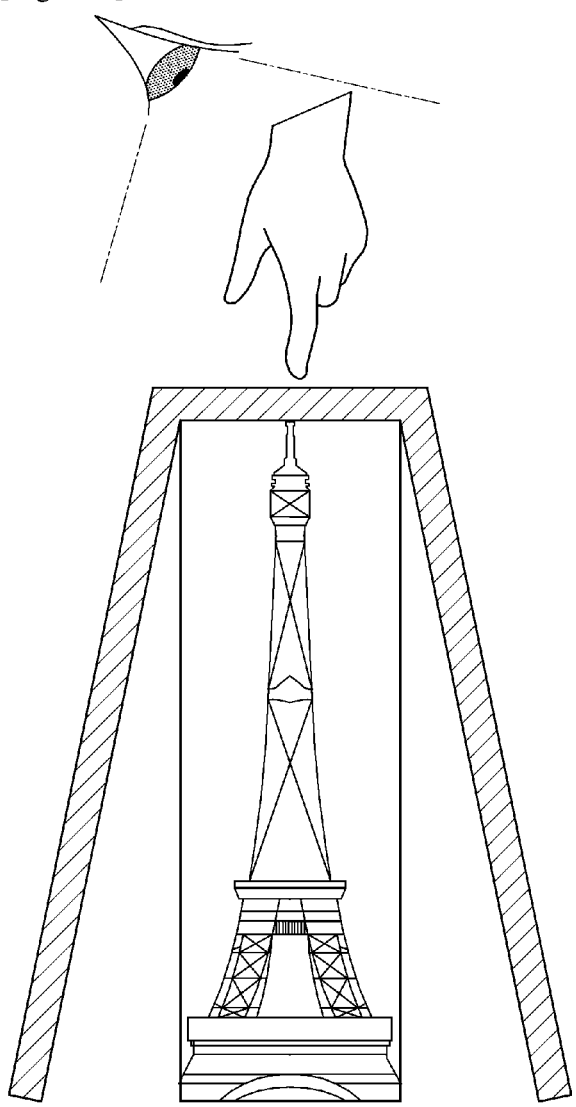
[Fig. 17a]

[Fig. 17b]
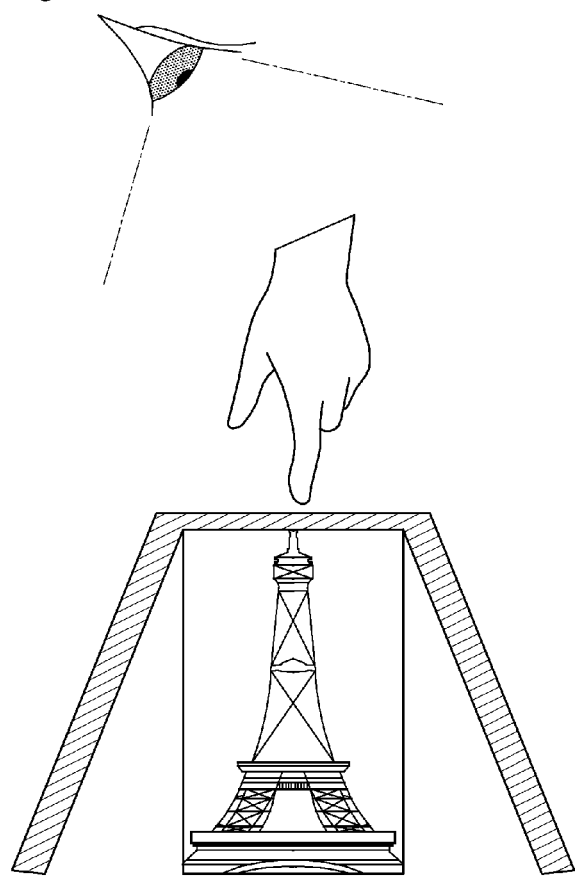

[Fig. 18a]
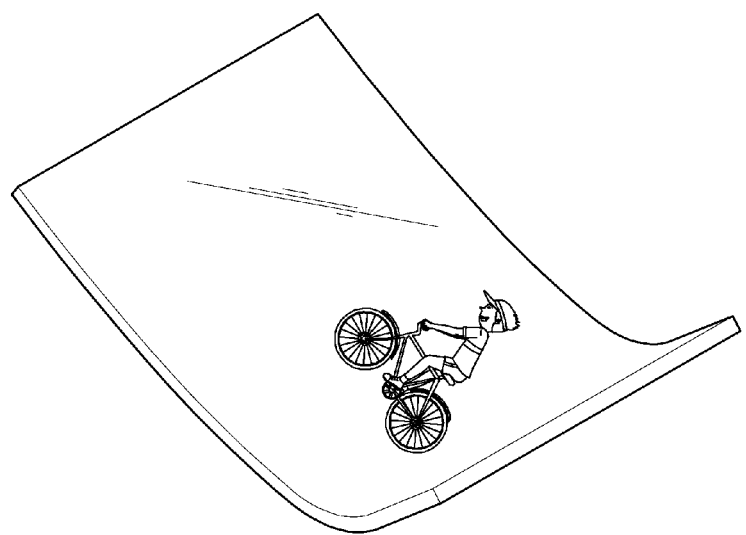
1810
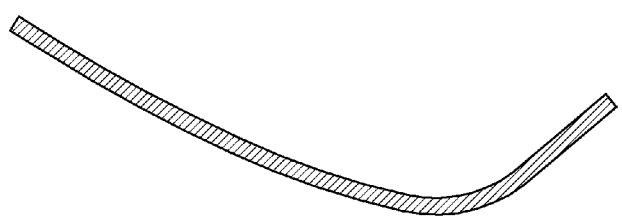
1801

[Fig. 18b]
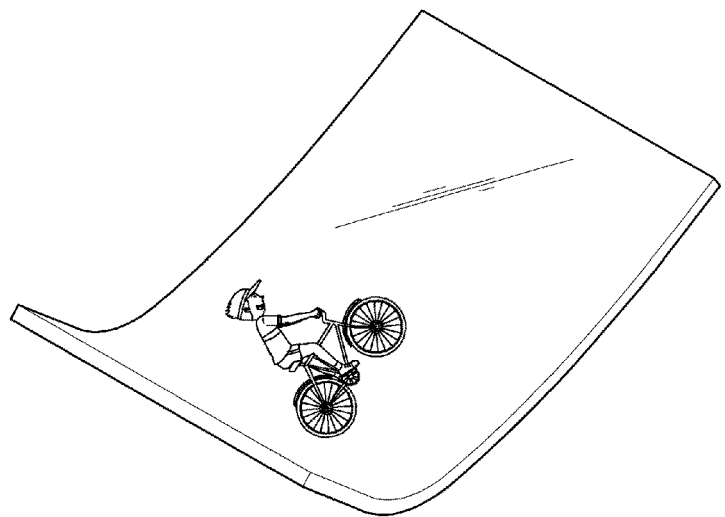
1810
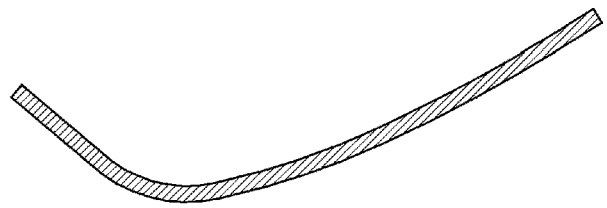
1802
[Fig. 19a]
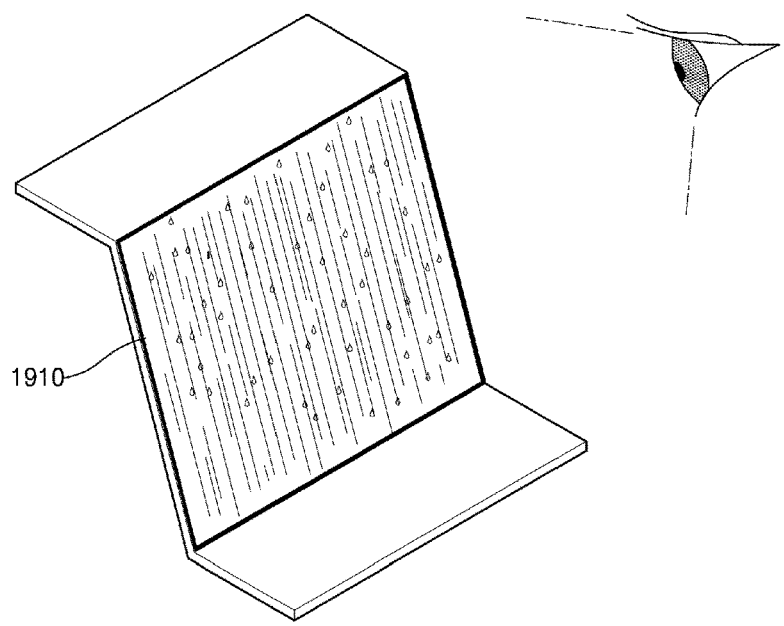
1910

[Fig. 19b]
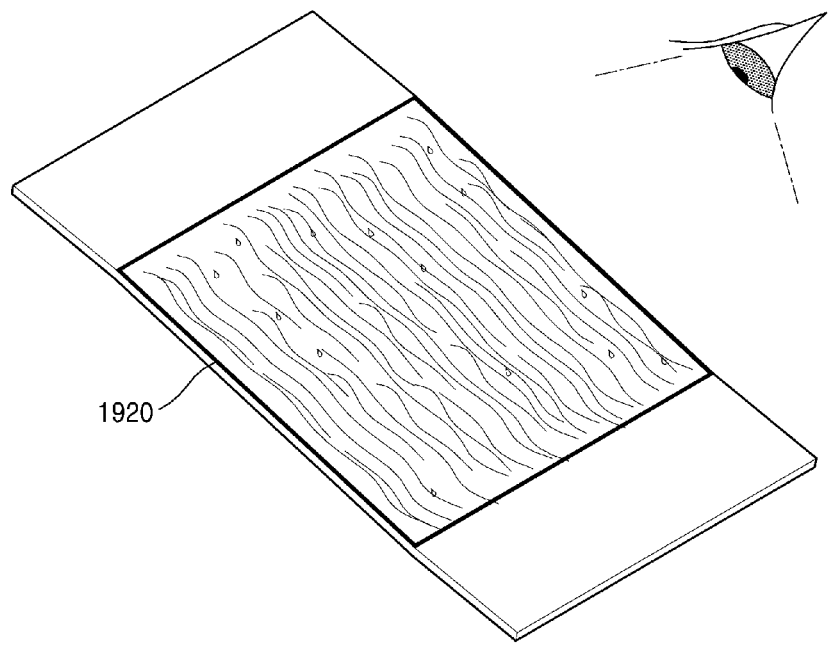
1920
[Fig. 20a]
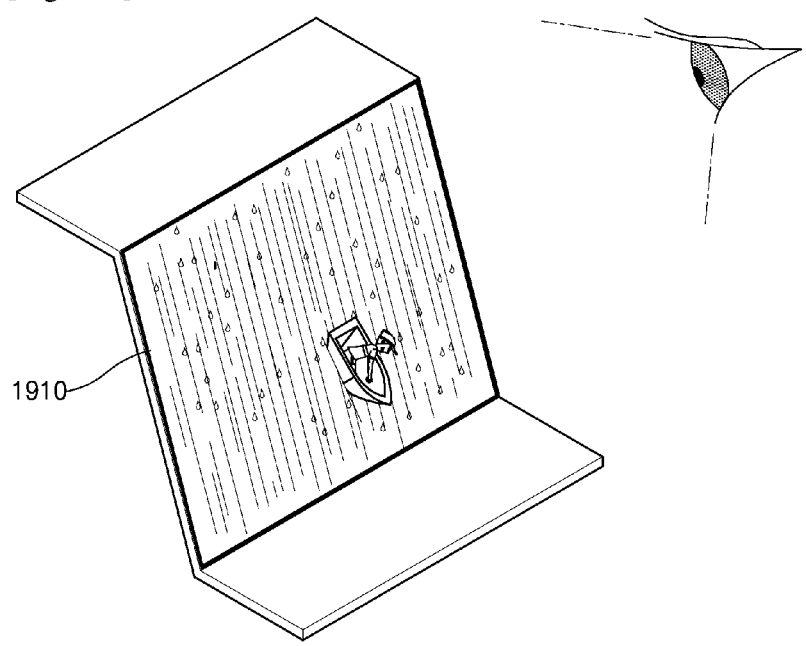
1910

[Fig. 20b]
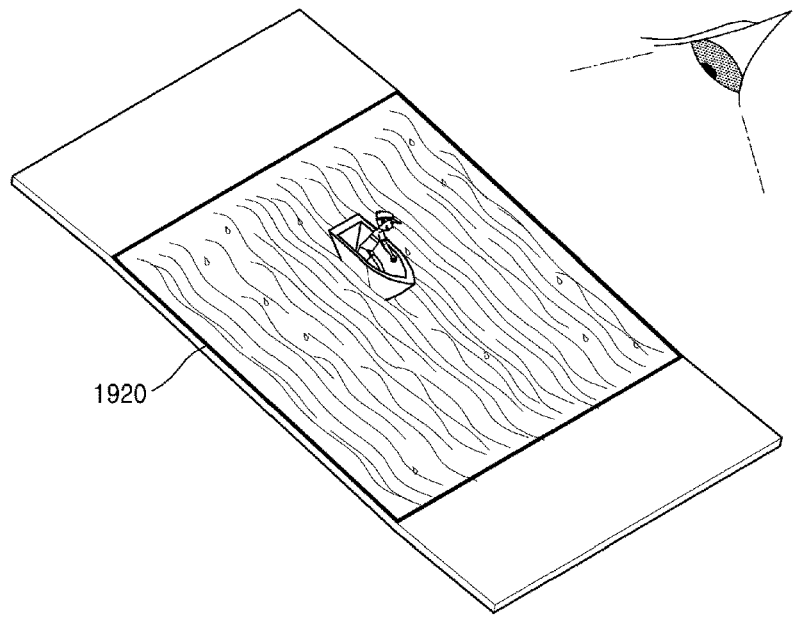
[Fig. 21]
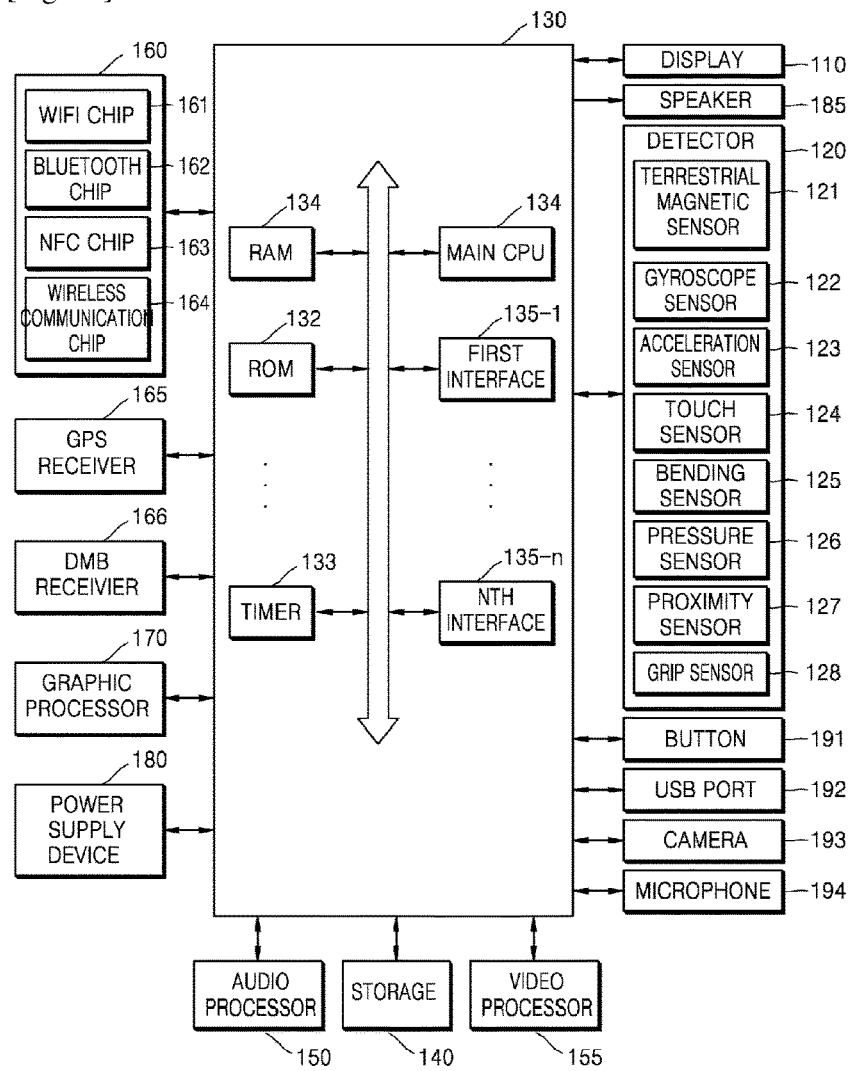

FLEXIBLE DEVICE AND METHOD OPERATING THE SAME

TECHNICAL FIELD

The present disclosure relates to flexible devices including a flexible display and methods operating the same.

BACKGROUND ART

Advances in display technology lead to development of a flexible display, a transparent display panel, or the like. The flexible display refers to a display apparatus that may be deformed, and thus, bent.

The flexible display is manufactured to be flexible so that the flexible display may be folded or unfolded, by replacing a glass substrate, which covers liquid crystal included in a liquid-crystal display (LCD) or an organic light-emitting diode (OLED), with a plastic film. Since the flexible display employs a plastic substrate instead of a glass substrate that is generally used, a low-temperature manufacturing process is used instead of a manufacturing process in the related art, so as to prevent a damage to the plastic substrate.

The flexible display is not only thin and light, but also strong at a shock. Additionally, the flexible display may be curved or bent, and may be manufactured in various forms. Particularly, the flexible display may be employed in an industrial field to which a display having a glass substrate in the related art has been limitedly applied or has not been applied.

For example, the flexible display may be applied to a new portable information technology (IT) product, for example, an electronic book that may replace a publication such as a magazine, a textbook, a book, a comic book, or the like, a micro personal computer (PC) that may be carried by folding or rolling a display, a smart card via which information may be checked in real time, or the like. Additionally, since the flexible display employs a flexible plastic substrate, the flexible display may be also applied to fashion clothes that people wear, or medical diagnosis.

As the flexible display is commercialized, a research is being performed on a new method of interfacing the flexible display by using flexible or foldable characteristics of the flexible display.

DISCLOSURE OF INVENTION

Solution to Problem

A flexible device includes: a display that may be bent by an external force; a sensor configured to sense at least one motion from the group consisting of a bending motion and a folding motion of the flexible device; and a controller configured to determine outer form information about the flexible device, which is obtained when the flexible device is deformed by the at least one motion, and control an object in a screen, displayed on the display, to be moved based on the outer form information.

Advantageous Effects of Invention

A flexible device includes: a display that may be bent by an external force; a sensor configured to sense at least one motion from the group consisting of a bending motion and a folding motion of the flexible device; and a controller configured to determine outer form information about the flexible device, which is obtained when the flexible device is deformed by the at least one motion, and control an object in a screen, displayed on the display, to be moved based on the outer form information.

BRIEF DESCRIPTION OF DRAWINGS

These and/or other aspects will become apparent and more readily appreciated from the following description of the exemplary embodiments, and reference numerals refer to structural elements, taken in conjunction with the accompanying drawings in which:

FIG. 1 illustrates a diagram for explaining a movement of an object in a screen according to a bending motion of a flexible device, according to an exemplary embodiment;

FIG. 2 is a block diagram of a configuration of hardware of the flexible device, according to an exemplary embodiment;

FIG. 3 is a flowchart of a method of operating the flexible device, according to an exemplary embodiment;

FIG. 4 is a flowchart of a method of operating the flexible device, according to another exemplary embodiment;

FIG. 5 is a flowchart of a method of operating the flexible device, according to another exemplary embodiment;

FIG. 6 illustrates a diagram for explaining a bending form of the flexible device, according to an exemplary embodiment;

FIG. 7 illustrates a diagram for explaining a sensor included in the flexible device, according to an exemplary embodiment;

FIG. 8 illustrates a diagram for explaining a degree to which the flexible device is bent, according to an exemplary embodiment;

FIG. 9 illustrates a diagram for explaining a direction of a force exerted on an object in a screen according to a form in which the flexible device is bent, according to an exemplary embodiment;

FIGS. 10A and 10B illustrate diagrams for explaining outer form information about the flexible device, according to an exemplary embodiment;

FIGS. 11A and 11B illustrate diagrams for explaining movement of an object in a screen according to a degree to which the flexible device is bent, according to an exemplary embodiment;

FIGS. 12A and 12B illustrate diagrams for explaining movement of an object in a screen according to a degree to which the flexible device is bent, according to another exemplary embodiment;

FIGS. 13A and 13B illustrate diagrams for explaining movement of an object according to a friction force in a screen, according to an exemplary embodiment;

FIGS. 14A and 14B illustrate diagrams for explaining movement of an object according to a friction force in a screen, according to an exemplary embodiment;

FIG. 15 illustrates a diagram for explaining a process of calculating an inclination of each bending area of the flexible device, according to an exemplary embodiment;

FIG. 16 illustrates a diagram for explaining a process of calculating an inclination of each bending area of the flexible device, according to another exemplary embodiment;

FIGS. 17A and 17B illustrate diagrams for explaining movement of an object in a screen according to a degree to which the flexible device is bent, according to an exemplary embodiment;

FIGS. 18A and 18B illustrate diagrams for explaining movement of an object in a screen according to a degree to which the flexible device is bent, according to another exemplary embodiment;

FIGS. 19A and 19B illustrate diagrams for explaining movement of an object in a screen according to a degree to which the flexible device is bent, according to another exemplary embodiment;

FIGS. 20A and 20B illustrate diagrams for explaining movement of an object in a screen according to a degree to which the flexible device is bent, according to another exemplary embodiment; and FIG. 21 is a block diagram of a configuration of hardware of the flexible device, according to an exemplary embodiment.

BEST MODE FOR CARRYING OUT THE INVENTION

Provided are devices having a flexible display and methods operating the same.

Provided are non-transitory computer-readable recording storage media having recorded thereon a computer program which, when executed by a computer, performs the method.

Additional aspects will be set forth in part in the description which follows and, in part, will be apparent from the description, or may be learned by practice of the presented exemplary embodiments.

According to an aspect of an exemplary embodiment, a flexible device includes: a display that may be bent by an external force; a sensor configured to sense at least one motion from the group consisting of a bending motion and a folding motion of the flexible device; and a controller configured to determine outer form information about the flexible device, which is obtained when the flexible device is deformed by the at least one motion, and control an object in a screen, displayed on the display, to be moved based on the outer form information.

The controller may classify the screen into at least one area based on at least one bending area or at least one folding area, and control the object to be moved based on outer form information about the at least one area.

The display may display an image in which the object is moved based on the outer form information.

The controller may detect a first area in which the object is located, from among the at least one area, and control the object to be moved based on at least one from the group consisting of an inclination of the first area and a friction force on a part of the screen which corresponds to the first area.

A speed at which the object is moved in the first area by the controller may be proportional to the inclination of the first area, and inversely proportional to the friction force on the part of the screen which corresponds to the first area.

If the inclination of the first area is different from an inclination of the second area, the controller may control the speed at which the object is moved in the first area to be different from a speed at which the object is moved in a second area.

The controller may control the object to be moved based on at least one selected from the group consisting of peripheral information about the object that is moving, and a direction in which the object is moved.

The peripheral information may include sizes of obstacles and a number of the obstacles in the first area.

The flexible device may further include a user interface configured to receive an input signal for determining a magnitude and a direction of a force that is virtually applied to the object in the screen.

The controller may control the object to be moved in the screen, based on the input signal and the outer form information.

The input signal may be a swipe input, a flick input, or a drag and drop input.

The user interface may be a touch panel configured to detect a touch input, and the touch panel may be formed as one body with the display and detects the touch input.

The sensor may obtain physical information about the flexible device which is obtained when the flexible device is deformed by the at least one motion, and the controller may determine outer form information about the at least one area based on the physical information.

The physical information may include at least one selected from the group consisting of an angle at which the flexible device is bent, a curvature to which the flexible device is bent, an angle at which the flexible device is folded, and a curvature to which the flexible device is folded.

The sensor may be included on a surface of the display and bent as one body with the display, and may include a plurality of sensors.

The screen may be displayed in a form of a three-dimensional (3D) image, as the outer form information about the at least one area is changed, the controller may obtain an image, in which 3D data corresponding to the at least one area is changed and control the object to be moved in the image in which the 3D data is changed, and the display may display a screen in which the object is moved in the image in which the 3D data is changed.

According to an aspect of another exemplary embodiment, a method of operating a flexible device includes: sensing at least one motion from the group consisting of a bending motion and a folding motion of the flexible device; determining outer form information about the flexible device, which is obtained when the flexible device is deformed by the at least one motion; and controlling an object in a screen, displayed on the display included in the flexible device, to be moved based on the outer form information.

The determining of the outer form information may include classifying the screen into at least one area based on at least one bending area or at least one folding area, and the controlling of the object to be moved may include: detecting a first area in which the object is located, from among the at least one area; and controlling the object to be moved based on at least one from the group consisting of an inclination of the first area and a friction force on a part of the screen which corresponds to the first area.

The method may further include receiving an input signal for determining a magnitude and a direction of a force that is virtually applied to the object in the screen, wherein the controlling of the object to be moved includes controlling the object to be moved in the screen, based on the input signal and the outer form information.

According to an aspect of another exemplary embodiment, a non-transitory computer-readable recording storage medium having recorded thereon a computer program which, when executed by a computer, may perform a method of operating a flexible device, the method including: sensing at least one motion from the group consisting of a bending motion and a folding motion of the flexible device; determining outer form information about the flexible device, which is obtained when the flexible device is deformed by the at least one motion; and controlling an object in a screen, displayed on the display included in the flexible device, to be moved based on the outer form information.

MODE FOR THE INVENTION

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Advantages and features of exemplary embodiments and methods of accomplishing the same may be understood more readily with by reference to the following detailed description of exemplary embodiments and the accompanying drawings. However, exemplary embodiments are not limited to the embodiments set forth herein, and may be embodied in many different forms. The embodiments are provided so that this disclosure will be thorough and complete, and will fully convey the concept of the exemplary embodiments to those skilled in the art, and the scope of exemplary embodiments should be defined by the appended claims. Like reference numerals in the drawings denote like elements.

Terms used herein will be briefly described, and exemplary embodiments will be described in detail below.

General and widely-used terms have been employed herein, in consideration of functions provided in the exemplary embodiments, and may vary according to an intention of one of ordinary skill in the art, a precedent, or emergence of new technologies. Additionally, in some cases, an applicant may arbitrarily select specific terms. Then, the applicant will provide the meaning of the terms in the description of the exemplary embodiments. Accordingly, It will be understood that the terms, used herein, should be interpreted as having a meaning that is consistent with their meaning in the context of the relevant art and will not be interpreted in an idealized or overly formal sense unless expressly so defined herein.

It will be further understood that the terms "comprises," "comprising," "includes," and/or "including," when used herein, specify the presence of components, but do not preclude the presence or addition of one or more other components, unless otherwise specified. Additionally, a term 'unit' means software or hardware components such as field programmable gate array (FPGA) or application-specific integrated circuit (ASIC), and a "unit" performs some functions. However, a "unit" is not limited to hardware or software. A "unit" may be configured to be included in a storage medium that may be addressed, or configured to play one or more processors. Accordingly, as an example, a "unit" includes components such as software components, object-oriented software components, class components, or task components, processes, functions, attributes, procedures, subroutines, segments of a program code, drivers, firmware, micro-codes, circuits, data, database, data structures, tables, arrays, or variables. Functions provided in components or "units" may be combined into a small number of components or "units", or separated into additional components or "units".

A "folding motion" or a "bending motion", described herein, refers to a motion in which a flexible device or a flexible display is folded or bent. On the contrary, an "unfolding motion" or an "unbending motion", described herein, refers to a motion in which a flexible device or a flexible display is unfolded or unbent. This is to be described in detail later.

Particularly, "deforming" of a flexible device refers to a state when an outer form of a flexible device is changed, like "folding", "bending", or the like. Accordingly, a term "deforming", described herein, may be interpreted as, and thus, replaced by terms "folding", "unfolding", "bending", "unbending", or the like.

Exemplary embodiments will now be described more fully with reference to the accompanying drawings, in which exemplary embodiments are shown. The exemplary embodiments may, however, be embodied in many different forms and should not be construed as being limited to the embodiments set forth herein. In the description of the exemplary embodiments, certain detailed explanations of the related art are omitted when it is deemed that they may unnecessarily obscure the essence of the exemplary embodiments.

FIG. 1 illustrates a diagram for explaining movement of an object in a screen according to a bending motion of a flexible device, according to an exemplary embodiment.

Referring to FIG. 1, the flexible device may be implemented by using devices having various purposes. For example, the flexible device may be implemented as a cellular phone, a smartphone, a laptop computer, a tablet device, an electronic book device, a smart TV, a digital broadcasting device, a personal digital assistant (PDA), a portable multimedia player (PMP), a navigation system, or the like.

The flexible device includes a display that may be bent by an external force. In other words, the flexible device includes a flexible display. The flexible display may include various types of display that may be deformed by an external force, such as a foldable display that may be folded at a particular angle or to a particular curvature, a bendable display that may be bent or unbent to a particular curvature, a rollable display that may be rolled to have a cylindrical shape, or the like.

Like a display in the related art, such as a liquid crystal display (LCD), a light-emitting diode (LED) display, or the like, the flexible display has a display interface function of providing a user interface screen about information processed or to be processed by a flexible device. In other words, the flexible display may display an execution screen, a lock screen, a background screen, or the like with respect to an application program.

Referring to a display 10 shown in FIG. 1, before an external force is applied to a flexible device, the flexible device has a flat outer form. For example, a game application related to a motorcycle race may be executed by the flexible device. The flexible device may execute a screen of the game application related to the motorcycle race. Before an outer form of the flexible device is changed by an external force exerted on the flexible device, the flexible device provides a screen of the game application in a flat form. If the outer form of the flexible device is changed, the flexible device provides a screen of the game application in a bent form, according to the changed outer form. A "screen", described herein, refers to a screen displayed on a display included in the flexible device. Additionally, a "game application screen" or a "screen of a game application" refers to a screen displayed on the display as a result of executing the game application.

Referring to a display 20 shown in FIG. 1, an outer form of the flexible device may be changed by an external force. In detail, the flexible device may detect a bending motion by using a bending sensor, and determine a bending area.

The bending sensor refers to a sensor that may be bent, and whose resistance value may vary according to a degree to which the bending sensor is bent. The bending sensor may be implemented as a strain gauge. The strain gauge detects deformation of a surface of an object to be measured, according to a change in the resistance value, by using metal or a semiconductor whose resistance is greatly changed according to a magnitude of a force exerted on the strain gauge. Generally, if a length of a material such as metal increases according to an external force exerted on the material, a resistance value of the material increases. If a length of a material such as metal decreases according to an external force exerted on the material, a resistance value of the material decreases. Accordingly, when a change in a resistance value is detected, it may be determined whether the material is bent.

The bending sensor detects a resistance value of the bending sensor by using a magnitude of a voltage applied to the bending sensor or a magnitude of current flowing through the bending sensor, and detect a state when the bending sensor is bent at a location of the bending sensor according to a magnitude of a resistance value.

Referring to the display 20 shown in FIG. 1, bending areas are caused by external force, and located at a lower right part of the flexible device. A "bending area" used herein may refer to a bent and curved area of the display included in the flexible device. Since bending sensors are also bent as the flexible device is bent, bending areas may be all locations where bending sensors, which output a resistance value different from a resistance value in an original state, are arranged. The flexible device may detect sizes of the bending areas, the locations of the bending areas, a number of the bending areas, locations of bending lines, a direction in which the bending line is located, or the like.

Referring to a display 30 shown in FIG. 1, the flexible device may control movement of an object in a screen, based on outer form information about the flexible device. The "outer form information" may refer to form information about the flexible device which is obtained after the flexible device is deformed by an external force. In detail, the outer form information may refer to bending areas of the display included in the flexible device and a degree to which the flexible device is bent, may include elements which are obvious to one of ordinary skill in the art.

As a detailed example, if the flexible device is bent in a right direction, the flexible device may provide a visual effect such that a motorcycle in a screen is running on a surface that inclined in a right direction. If the inclined surface is steep, the flexible device may provide a visual effect such that the motorcycle moves fast in the right direction.

FIG. 2 is a block diagram of a configuration of hardware of a flexible device 200, according to an exemplary embodiment.

According to an exemplary embodiment, the flexible device 200 may include a sensor 210, a controller 220, and a display 230. However, the elements, shown in FIG. 2, are not essential elements. The flexible device 200 may be implemented by using more or less elements than those shown in FIG. 2. Hereinafter, the elements described above are described.

The sensor 210 may detect a bending motion of the flexible device 200. For example, the sensor 210 may include a bending sensor for detecting a bending input. Additionally, the sensor 210 may consist of the bending sensor and other various types of sensors combined with the bending sensor, and thus, obtain detailed information about a degree to which the flexible device 200 is bent. In detail, if the flexible device 200 is bent, the sensor 210 may detect a bending curvature indicating a degree to which the flexible device 200 is bent.

Additionally, the sensor 210 may detect a folding motion or an unfolding motion of the flexible device 200. A "folding motion" described herein may refer to a motion via which a state of the flexible device 200 is changed from a folding state to an unfolding state. A "folding motion" may be a motion via which the flexible device 200 is bent along a folding axis. Additionally, the flexible device 200 may include two or more folding axes. A folding axis, described herein, refers to a line along which the flexible device 200 is bent. As a detailed example, a folding axis may be an axis along which the flexible device 200 is bent by using a hinge unit included in the flexible device 200. If the flexible device 200 is symmetrically folded along a folding axis, the folding axis may be a center line of the flexible device 200. On the contrary, if the flexible device 200 is asymmetrically folded along a folding axis, the folding axis may not be a center line of the flexible device 200. An "unfolding motion" may be a motion via which a state of the flexible device 200 is changed from an unfolding state to a folding state. Additionally, the sensor 210 may detect a folding motion or an unfolding motion by using a hole sensor or a magnetic sensor included in a folding structure.

The sensor 210 detects a degree to which the flexible device 200 is deformed. While the flexible device 200 is deformed, the sensor 210 may detect a range in which the flexible device 200 is deformed. Additionally, since the display 230 is deformed to have a same form as that of the flexible device 200, a degree to which the flexible device 200 is deformed may refer to a degree to which the display 230 is deformed.

Additionally, the sensor 210 may be included on a surface of the display 230, and thus, bent as one body with the display 230. The sensor 210 may include a plurality of sensors, and detect deformation of the display 230 by using the plurality of sensors.

The controller 220 includes a configuration of hardware implemented as at least one processor such as a central processing unit (CPU), an application processor (AP), or the like, and controls all operations of the flexible device 200.

The controller 220 determines outer form information about the flexible device 200 which is obtained after the flexible device 200 is deformed by at least one selected from the group consisting of a bending motion and a folding motion. The controller 220 may control an object in a screen displayed on the display 230 to be moved, based on the outer form information.

The controller 220 may classify a screen into at least one area, based on the at least one bending area or at least one folding area. The controller 220 may control an object to be moved, based on outer information about the at least one area.

"Outer form information" may indicate a degree to which the flexible device 200 is deformed (for example, bending, folding, unbending, unfolding, or the like). In detail, the outer form information may include information for classifying a screen, displayed on the flexible device 200, into at least one area based on a bending area or a folding area. Additionally, the outer form information may include at least one selected from the group consisting of an inclination of the at least one area, an angle at which the flexible device 200 is bent, a curvature to which the flexible device 200 is bent, an angle at which the flexible device 200 is folded, and a curvature to which the flexible device 200 is folded.

The controller 220 may control a virtual force to be applied to an object, in consideration of a physical force that may be substantially applied to that object via an outer form of the flexible device 200. Here, the physical force may include gravity, a friction force, an external force, or the like, but is not limited thereto. A virtual force, exerted on the object, may be force that is substantially exerted on the object, or may be determined in consideration of a magnitude and a direction of a force that is substantially exerted on the object. For example, a virtual force may be determined by expanding or reducing a force that is substantially exerted on the object according to predetermined criteria. A direction in which a force is substantially exerted on the object may match a direction in which a virtual force is exerted on the object.

The controller 220 may detect a first area in which the object is located, from the at least one area of a screen, and control the object to be moved based on at least one selected from the group consisting of an inclination of the first area and a friction force on a part of the screen corresponding to the first area.

In detail, a speed at which the object is moved by the controller 220 may be proportional to an inclination of the first area, and inversely proportional to a friction force on the part corresponding to the first area. Here, an inclination of the first area may refer to a degree to which the first area is inclined. Additionally, if an inclination of the first area is smaller than that of a second area, the controller 220 may control the object in the first area to move faster than in the second area.

Additionally, since peripheral information about the object may vary according to a moment at which the object moves, the controller 220 may control movement of the object in consideration of the peripheral information about the object that is moving. Additionally, even though the object moves in the first area, since a force exerted on the object may vary according to a direction in which the object moves, the controller 220 may control movement of the object in consideration of a direction in which the object moves. Here, as an example, peripheral information about the object may include at least one selected from sizes of obstacles and a number of the obstacles in the first area. Additionally, since a friction force on the part of the screen corresponding to the first area may vary according to movement of the object, the controller 220 may control movement of the object in consideration of a friction force, even when the object moves in a same area.

The control unit 220 may control the display 230 to display a certain screen. The display 230 may display a certain screen, so that a user may visually recognize a certain image or certain information.

The display 230 displays a certain screen. In detail, the display 230 may display a certain screen according to control by the control unit 220. The display 230 includes a display panel, and may display a user interface screen on the display panel.

The display 230 may include a substrate, a driving unit, a display panel, and a protective layer.

The display 230 may display an image in which an object moves, based on outer form information about the flexible device 200. The display 230 may output various information, processed by the flexible device 200, on a screen via a graphical user interface (GUI).

Additionally, the display 230 may display a three-dimensional (3D) image on a screen. As outer form information about at least one area is changed, the control unit 220 may obtain an image in which 3D data corresponding to the at least one area is changed. Additionally, the control unit 220 may control the object to move in the image in which the 3D data is changed. The display 230 may display a screen in which the object moves in the image in which the 3D data is changed.

The flexible device 200 may further include a user interface. The user interface refers to an apparatus for receiving an input of data for controlling the flexible device 200 from a user. The user interface may include a hardware configuration such as a key pad, a mouse, a touch panel, a touchscreen, a track ball, a jog switch, or the like, but is not limited thereto. Additionally, the user interface may further include various input elements such as a voice recognition sensor, a gesture recognition sensor, a fingerprint recognition sensor, an iris recognition sensor, a depth sensor, a distance sensor, or the like.

The user interface receives an input signal for determining a magnitude and a direction of a force that is virtually applied to an object in a screen. The control unit 220 may move the object in the screen, based on the input signal and outer form information about the flexible device 200. Here, the input signal may include at least one selected from the group consisting of a touch signal and a drag and drop signal. In detail, the input signal may include at least one selected from the group consisting of, for example, a time point when a touch starts, a time point when a touch ends, a location where a touch starts, and a location where a touch ends, with respect to a touch signal.

The user interface may receive an input of a certain command or data from a user via a user interface screen. In detail, the user interface screen may receive an input of a control signal for moving an object by using various input tools. A control signal may be received according to a touch input by a user. The user interface screen may receive, as a drag and drop signal, a signal for moving an object displayed on a screen by using a hand of a user or a physical tool. The control unit 220 may move the object in the screen according to a signal for moving the object.

The user interface may generate and output the user interface screen for receiving a certain command or data from a user. For example, the user interface may generate a user interface screen in which a visual representation is dynamically changed according to a degree to which the flexible device 200 is bent and which is detected by the flexible device 200.

The flexible device 200 may further include a storage (not shown). The storage (not shown) may store physical values detected by the sensor 210. As a detailed example, the bending sensor calculates a difference between a resistance value at a position where a greatest resistance value is output, and a resistance value that is output at a position that is a certain distance away from the position where the greatest resistance value is output. The control unit 220 may determine a degree to which the flexible device 200 is bent, by using the calculated difference between the resistance values. The storage (not shown) may classify degrees to which the flexible device 200 is bent into a plurality of levels, match resistance values within a certain range with each level, and then, store the resistance values so that the resistance values within a certain range match each level. The control unit 220 may determine a degree to which the flexible device 200 is bent according to a level to which a difference between resistance values belongs, from among the plurality of levels that matches a difference between the resistance values stored in the storage (not shown). Here, the storage (not shown) may be implemented as various types of storage media such as flash memory, a hard disk, electrically erasable programmable read only memory (EEPROM), or the like. Additionally, the storage (not shown) may store outer form information about the flexible device 200.

The flexible device 200 may further include a communication unit (not shown). The flexible device 200 may provide various content via an application. The communication unit (not shown) may transmit outer form information about the flexible device 200 to a server of an application. Additionally, the server of the application may receive the outer form information transmit a result of reflecting the outer information in the application to the communication unit. In this case, the communication unit (not shown) may be connected to the server of the application via a communication network such as wireless fidelity (WiFi) or WiFi direct (WFD). In detail, a wireless network that may be connected to the communication unit (not shown) may be a wireless local area network (LAN), WiFi, Bluetooth, Zigbee, WFD, ultra-wideband (UWB), infrared data association (IrDA), Bluetooth Low Energy (BLE), near-field communication (NFC), or the like, but is not limited thereto.

The flexible device 200 may include a central operation processor, and thus, control operation of the sensor 210, the controller 220, and the display 230. The central operation processor may be implemented as an array of a plurality of logic gates or as a combination of a general-use microprocessor and a memory storing a program executable in the microprocessor. Alternatively, it may be understood by one of ordinary skill in the art that the central operation processor may be embodied as hardware in another form.

Hereinafter, various operations and applications of the flexible device 200 are described. Even if an element from among the sensor 210, the control unit 220, and the display 230 is not particularly specified, information that may be clearly understand and predicted by one of ordinary skill in the art may be understood as a general implementation, and a scope of exemplary embodiments is not limited by a name or a physical/logical structure of a particular element.

Hereinafter, if a "bending motion" of the flexible device 200 is described, it may be understood by one or ordinary skill in the art that the "bending motion" is not limited to a "bending motion" and may be applied to a "folding motion".

FIG. 3 is a flowchart of a method of operating the flexible device 200, according to an exemplary embodiment.

In operation 310 described with reference to FIG. 3, the flexible device 200 detects at least one motion from the group consisting of a bending motion and a folding motion of the flexible device 200. As an example of detecting a bending motion of the flexible device 200, the flexible device 200 may detect a bending motion by using a magnitude of a voltage applied to the bending sensor or a magnitude of current flowing through the bending sensor. Additionally, the flexible device 200 may detect a resistance value by using a magnitude of a voltage and/or a magnitude of current, and detect a state of a bending area according to a magnitude of the resistance value.

In operation S320, the flexible device 200 determines outer form information about the flexible device 200 which is obtained after the flexible device 200 is deformed according to the at least one selected from the group consisting of the bending motion and the folding motion. As an example of determining the outer form information about the flexible device 200, a particular area of the flexible device 200 may be determined as a flat area or a bending area. If a resistance value, output by the bending sensor, is greatest at a particular position in the flexible device 200, and the output resistance value is gradually decreased in directions towards both sides of the flexible device 200, the flexible device 200 may determine an area of the flexible device 200, in which the greatest resistance value is detected, as an area in which flexible device is bent greatest. Additionally, the flexible device 200 determines an area in which a resistance value is not changed as a flat area in which the flexible device 200 is not bent, and determines an area in which a resistance value is changed in correspondence with a certain value or greater as a bending area in which the flexible device 200 is bent.

In operation S330, the flexible device 200 may control an object in a screen to move based on the outer form information. In detail, the flexible device 200 may apply a virtual force to the object in the screen, according to a degree to which the flexible device 200 is bent. If the object receives the virtual force, the object may move according to a magnitude and a direction of the virtual force. Movement of the object may be decelerated or accelerated compared to movement of the object before the object receives the virtual force.

FIG. 4 is a flowchart of a method of operating the flexible device 200, according to another exemplary embodiment.

In operation S410 described with reference to FIG. 4, the flexible device 200 classifies a screen displayed on the flexible device 200 into at least one area, based on at least one bending area or at least one folding area. In detail, the bending area refers to an area in which the display 230 included in the flexible device 200 is bent and curved. Additionally, a bending area may be distinguished from other areas based on a relation between positions in which a change in a resistance value is detected. In detail, if a distance between the positions in which the change in the resistance value is a predetermined distance or less, the flexible device 200 may detect positions in which a resistance value is output as a bending area. On the contrary, from among the positions in which the change in the resistance value is detected, positions that are away from each other in correspondence with a predetermined distance or greater are present, the flexible device 200 may detect the positions as bending areas different from each other.

In operation S420, the flexible device 200 may detect a first area in which an object is located, from among the at least one area. In detail, since an area that does not include an object does not directly affect movement of the object, the flexible device 200 may detect the first area in which the object is located, from the bending areas different from each other.

In operation S430, the flexible device 200 may control the object in the screen to be moved, based on at least one selected from the group consisting of an inclination of the first area and a friction force on the first area. The flexible device 200 may control movement of the object in the screen, based in an internal element and an external element of the screen. The internal element of the screen may be a friction force or an obstacle in an area in which the object in the screen moves. The external element of the screen may be a form obtained when a form of the flexible device 200 is changed by an external force. The flexible device 200 may control movement of the object in the screen, based on an inclination of the first area or a friction force on the first area in which the object is located. In detail, if an inclination of the first area is different from an inclination of a second area, the flexible device 200 may control a speed at which the object moves in the first area to be different from a speed at which the object moves in the second area.

FIG. 5 is a flowchart of a method of operating the flexible device 200, according to another exemplary embodiment.

In operation S510 described with reference to FIG. 4, the flexible device 200 receives an input signal for determining a magnitude and a direction of a force that is virtually applied to an object in a screen. The flexible device 200 may receive a virtual input signal that is applied to the object via a user interface. Here, the input signal may be a touch signal or a drag and drop signal. A drag refers to a touch gesture of moving a touch point from a location to another location, and may include various gestures of using a dragging method such as a flick, a sweep, a swipe, a pinch, a rotation, or the like.

In operation S520, the flexible device 200 controls movement of the object in the screen, based on the magnitude and the direction of the force which are determined according to the input signal, and outer form information about the flexible device 200. The user interface may receive a touch input via a touch panel. The flexible device 200 may control the magnitude of the force, which is virtually applied to the object, to increase when the touch input is maintained for a long period of time. Additionally, the flexible device 200 may control a direction of the touch input as a direction in which the force is virtually applied to the object.

Additionally, a magnitude of a force which is determined according to the input signal may be determined based on a time point when the touch input starts and a time point when the touch input ends. If a different between the time point when the touch input starts and the time point when the touch input ends is great, the magnitude of the force may linearly increase.

Additionally, a direction of a force which is determined according to the input signal may be determined based on a location where the touch input starts and a location where the touch input ends. If a vector may be calculated by using the location where the touch input starts and the location where the touch input ends, and thus, a direction of the force may be determined.

Additionally, the flexible device 200 may control movement of the object in the screen based on the outer form information about the flexible device 200, other than the input signal input via the user interface. As a detailed example, a speed at which the object moves may be greater in a bending area than in a flat area.

In operation S530, the flexible device 200 displays a screen that includes an image in which the object moves. The flexible device 200 may display the screen via the display 230 that is bent by an external force. Additionally, the flexible device 200 provide a vivid visual effect by displaying an image in which the object is moved, based on the outer form information.

FIG. 6 illustrates a diagram for explaining a bending form of the flexible device 200, according to an exemplary embodiment.

As shown in FIG. 6, the flexible device 200 may be bent in various forms such as a form 610, 620 630, 640, 650, 660, or 670. A whole area of the display 230 included in the flexible device 200 may be classified into a bending area in which bending is detected, a flat area in which bending is not detected, and a bending line. The bending line may be a line connecting positions which are different from each other and in which a maximum resistance value is output by the bending sensor. In other words, the bending line may be a line connecting positions in each bending area, where a greatest resistance value is detected, to each other.

Bending may be performed in various locations in the device 200. In detail, bending may be performed in an area in which an edge is present, an area in which a vertex is present, a center area, an area in which a diagonal line is present, or the like.

FIG. 7 illustrates a diagram for explaining a sensor included in the flexible device 200, according to an exemplary embodiment.

According to an exemplary embodiment, a plurality of sensors may be equipped in the flexible device 200. A sensor may be equipped on a front surface of the display 230, or equipped on a rear surface of the display 230. Forms, a number, and locations of sensors may be variously changed. For example, the display 230 may include a bending sensor, or a plurality of bending sensors combined with each other. The bending sensor may detect bending data that is obtained according to a bending motion. Additionally, the plurality of band sensors may detect a plurality of bending areas and detect a state when a device is deformed.

Referring to an example 710 shown in FIG. 7, bending sensors may be located at a left part and a right part of the flexible device 200 with a certain interval therebetween. If the bending sensors are installed with a certain interval therebetween, an accuracy of detecting a degree to which the flexible device 200 is bent may deteriorate compared to when the bending sensors are installed at a whole left part and a whole right part of the flexible device 200. However, efficiency of the bending sensors may increase with respect to cost.

Referring to an example 720 shown in FIG. 7, bending sensors may be located at the whole left part and the whole right part of the flexible device 200. A degree to which the flexible device 200 is bent may be accurately detected, by locating the bending sensors at the whole left part and the whole right part of the flexible device 200.

Referring to an example 730 shown in FIG. 7, bending sensors may be located at a left part, a right part, an upper part, and a lower part of the flexible device 200 with a certain interval therebetween in each part. Referring to an example 740 shown in FIG. 7, bending sensors may be located at a whole left part, a whole right part, a whole upper part, and a whole lower part of the flexible device 200.

Referring to an example 750 shown in FIG. 7, bending sensors may be located at a side of the flexible device 200 to have a certain interval therebetween. If the bending sensors are located at the side of the flexible device 200, space utilization of the flexible device 200 may be enhanced.

Additionally, a bending sensor may be arranged at a side of the flexible device 200, and another sensor may be arranged on a front surface or a rear surface of the flexible device 200. In detail, if a touch sensor may be arranged on a front surface of the flexible device 200 and a bending sensor is arranged at a side of the flexible device 200, a user may select an object by using the touch sensor, and the flexible device 200 may control a screen, corresponding to information about an angle at which and a curvature to which the flexible device 200 is bent which is detected by the bending sensor, to be displayed.

Additionally, the bending sensor may be located at whole sides of the flexible device 200. A degree to which the flexible device 200 is bent may be accurately detected by installing the bending sensor at the whole sides of the flexible device 200.

It may be obvious to one of ordinary skill in the art that bending sensors may be arranged by using a method, other than the examples 710 through 750 shown in FIG. 7. For example, a plurality of bending sensors in the form of a bar may be arranged in horizontal and vertical directions to have a form of a lattice. In this case, the plurality of bending sensor in the form of a bar may be arranged to be separate from each other with a certain space therebetween.

Additionally, a number of bending sensor may be changed according to a size of the display 230 included in the flexible device 200. Additionally, since the bending sensors are arranged in the horizontal and vertical directions to detect bending of the whole display 230, if only a part of the flexible display 200 is flexible or bending of only a part of the flexible display 200 needs to be detected, bending sensors may be arranged only in the part of the flexible display 200 which is flexible or whose bending needs to be detected.

Additionally, the bending sensor may be implemented as an electrical resistance sensor using an electrical resistance or a micro optical fiber sensor using a strain of optical fiber.

FIG. 8 illustrates a diagram for explaining a degree to which the flexible device 200 is bent, according to an exemplary embodiment.

Referring to an example 810 shown in FIG. 8, a bending sensor may detect a bending curvature. For example, the bending sensor may detect a bending curvature in a range from +180 degrees to −180 degrees. Additionally, referring to an example 820 shown in FIG. 8, a plurality of bending sensors may be arranged to have a certain space therebetween, and each of the plurality of bending sensors may detect a bending curvature.

Additionally, the bending sensor may determine a degree to which the display 230 is bent, by using a change in a magnitude of a resistance value which is output with a certain interval. The flexible device 200 may classify a degree to which the display 230 is bent into a plurality of levels, and match a resistance value within a certain range with each level. For example, a degree to which the display 230 is bent may be determined based on a difference between a resistance value that is output at a first position in which a greatest resistance value is output, and a resistance value that is output at a second position located a certain distance away from the first position.

The flexible device 200 may identify a level to which a calculated difference between resistance values belongs, from among the plurality of levels, and determine a degree to which the display 230 is bent, which corresponds to the identified level. A degree to which the display 230 may be represented as an angle at which the display 230 is bent, a strength of the bending, or a pressure intensity.

FIG. 9 illustrates a diagram for explaining a direction of a force exerted on an object in a screen according to a form in which the flexible device 200 is bent, according to an exemplary embodiment.

As shown in FIG. 9, a user may deform the flexible device 200. The flexible device 200 may be deformed to various shapes by an external force by the user. If an external force is not present, the flexible device 200 is maintained to have a flat form.

An example 910 in FIG. 9 shows the flexible device 200 which is deformed so that a center of the flexible device 200 protrudes in a downward direction. If the flexible device 200 is deformed so that the center of the flexible device 200 protrudes in a downward direction, an object present in an arbitrary location of a screen of the flexible device 200 receives a force in a direction toward a bending area. As a detailed example, it is assumed that a ball is present in a screen. If the ball does not receive a force, the ball does not move on a flat surface. However, if the ball is on an inclined surface, since the ball receives a force in a direction of gravity, the ball moves. If the flexible device 200 is deformed so that a center thereof protrudes in a downward direction, the ball moves toward a part of the flexible device 200 which protrudes downward.

An example 920 in FIG. 9 shows the flexible device 200 which is deformed so that a center of the flexible device 200 protrudes in an upward direction. If the flexible device 200 is deformed so that the center thereof protrudes in an upward direction, an object present in an arbitrary location of a screen of the flexible device 200 receives a force in a downward direction with reference to a bending area. As a detailed example, if a ball is located in a bending area, the ball receives a force in a downward direction, and thus, moves.

An example 930 in FIG. 9 shows of the flexible device 200 which is deformed so that a left part of the flexible device 200 is inclined by an external force. With reference to a bending area, a left part of the flexible device 200 has an inclined surface, and a right part of the flexible device 200 has a flat surface. An object present in an arbitrary location of a screen of the flexible device 200 receives a force in a right-downward direction with reference to the bending area. As a detailed example, if a ball is located in the bending area, the ball moves from a left to right direction.

FIGS. 10A and 10B illustrate diagrams for explaining outer form information about the flexible device 200, according to an exemplary embodiment.

According to an exemplary embodiment, as shown in FIG. 10A, the flexible device 200 may be deformed by an external force. The flexible device 200 may detect a bending area or a folding area by using the sensor 210. The flexible device 200 may classify a screen of the flexible device 200 into at least one screen, based on at least one bending area or at least one folding area.

Referring to FIG. 10A, the flexible device 200 deformed by an external force may be classified into three areas 1001 through 1003. The three areas 1001 through 1003 may be classified into a first area 1001, a second area 1002, and a third area 1003. The three areas 1001 through 1003 may be classified by using boundary lines 1011 and 1012.

In detail, the flexible device 200 may calculate a degree of an inclination with respect to the first area 1001, the second area 1002, and the third area 1003 by using a gyroscope sensor and a bending sensor. The gyroscope sensor may detect an inclination of the flexible device 200, and the bending sensor may detect a pressure intensity in a bending area of the flexible device 200.

As shown in FIG. 10A, the gyroscope sensor detects a value of an inclination of the first area 1001 as 0. The bending sensor detects a bending direction corresponding to an in-bending direction or an out-bending direction. The gyroscope sensor detects a bending direction from the first area 1001 to the second area 1002 as an out-bending direction, and detects a value of a pressure intensity with respect to the bending direction as 30. Additionally, the bending sensor detects a bending direction from the second area 1002 to the third area 1003 as an in-bending direction, and detects a value of a pressure intensity with respect to the bending direction as 30. The flexible device 200 determines the first area 1001 as a flat area, and determines the second area 1002 as an inclined area that is inclined from a left upper part to a right lower part of the flexible device 200 by 30 degrees, and determines the third area 1003 as a flat area.

Referring to FIG. 10B, the flexible device 200 deformed by an external force may be classified into three areas 1004 through 1006. The three areas 1004 through 1006 may be classified into a fourth area 1004, a fifth area 1005, and a sixth area 1006. The three areas 1004 through 1006 may be divided by using boundary lines 1021 and 1022.

As shown in FIG. 10B, the gyroscope sensor detects a value of an inclination of the fourth area 1004 as 0. The gyroscope sensor detects a bending direction from the fourth area 1004 to the fifth area 1005 as an in-bending direction, and detects a value of a pressure intensity with respect to the bending direction as 30. Additionally, the bending sensor detects a bending direction from the fifth area 1005 to the sixth area 1006 as an out-bending direction, and detects a value of a pressure intensity with respect to the bending direction as 30. The flexible device 200 determines the fourth area 1004 as a flat area, determines the fifth area 1005 as an inclined area that is inclined from a left lower part to a right upper part of the flexible device 200 by 30 degrees, and determines the sixth area 1006 as a flat area.

Comparing FIG. 10A to FIG. 10B, an area of the flexible device 200, which is deformed by an external force, is classified into 3 identical area. However, since an in-bending area is different from an out-bending area, directions of inclinations of the three areas are different from each other. The flexible device 200 may determine an inclination with respect to an inclined area, by determining a direction of a bending area as an in-bending area or an out-bending area. The flexible device 200 may move an object in a screen, based on outer form information about the flexible device 200 which is obtained after the flexible device 200 is deformed by an external force.

FIGS. 11A and 11B illustrate diagrams for explaining movement of an object in a screen according to a degree to which the flexible device 200 is bent, according to an exemplary embodiment.

A degree at which the flexible device 200 is bent, shown in FIG. 11A, is different from a degree at which the flexible device 200 is bent, shown in FIG. 11B. An inclination of the flexible device 200, shown in FIG. 11A, is not as steep as that of the flexible device 200 shown in FIG. 11B. The flexible device 200 may move the object in the screen, so that outer form information about the flexible device 200 is reflected in the moving of the object. Accordingly, if a ball is located in a constant position, a distance for which the ball goes down along the flexible device 200 for a constant period of time may vary according to an inclination of the flexible device 200.

If the object is present in a first area of the screen of the flexible device 200, the flexible device 200 may move the object in proportion to an inclination of the first area. If an inclination of the first area is different from that of a second area, the flexible device 200 may control a speed at which the object moves in the first area to be different from a speed at which the object moves in the second area. In detail, if an inclination of the first area is smaller than that of the second area, the flexible device 200 may control the object in the first area to move faster than in the second area.

In detail, as shown in FIGS. 11A and 11B, an inclination of the screen shown in FIG. 11A is smaller than that of the screen shown in FIG. 11B. If the balls shown in FIGS. 11A and 11B are respectively located at a positon 1101 at a same time point, after a certain period of time elapses, the ball shown in FIG. 11A is located at a position 1102, and the ball shown in FIG. 11B is located at a position 1103. The flexible device 200 may reflect outer form information about the flexible device 200 in an actual movement of the ball. FIGS. 11A and 11B shows movement of the ball in the screen an example. However, it may be obvious to one of ordinary skill in the art that other objects in the screen may be also moved based on outer form information about the flexible device 200.

FIGS. 12A and 12B illustrate diagrams for explaining movement of an object in a screen according to a degree to which the flexible device 200 is bent, according to another exemplary embodiment.

The flexible device 200 may include a user interface consisting of a touch panel that is included as one body with the display 230 and detects a touch input. A user may input a touch signal for controlling an object in a screen via the user interface.

The user interface may receive an input signal for determining a magnitude and a direction of a force that is virtually applied to the object in the screen. As shown in FIG. 12A, the user may input a touch signal for moving a ball from a right to left direction at a position 1201. The flexible device 200 may determine a magnitude and a direction of a force that is virtually applied to the object, in consideration of a time period for which the touch signal is input, a direction in which the touch signal is input to the screen, or the like. Here, it may be obvious to one of ordinary skill in the art that a magnitude and a direction of a force, virtually applied to the object, may be determined by elements other than the elements described above.

As shown in FIGS. 12A and 12B, an inclination of a screen shown in FIG. 12A is smaller than an inclination of a screen shown in FIG. 12B. In respective cases described with reference to FIGS. 12A and 12B, it is assumed that respective balls are located at a position 1201 at a same time point, and a user interface receives a same touch input. After a certain period of time elapses, the ball is located at a position 1202 in the case described with reference to FIG. 12A, and the ball is located at a position 1203 in the case described with reference to FIG. 12B.

It is described as an example that the balls in FIGS. 12A and 12B receive a same touch input when outer form information about the flexible device 200 shown in FIG. 12A is different from that shown in FIG. 12B. However, if a magnitude of a force virtually applied by the touch input to the ball, shown in FIG. 12B, is greater than that applied by the touch input to the ball, shown in FIG. 12A, a position 1203 shown in FIG. 12B may be located at a height equal to or greater than that of the position 1202 shown in FIG. 12A. In detail, a magnitude of a force virtually applied to the ball may be determined as being proportional to a difference between a time point when the touch input starts and a time point when the touch input ends. Accordingly, if a time period for which the touch input is performed with reference to FIG. 12B is longer than a time period for which the touch input is performed with reference to FIG. 12A, the position 1203 shown in FIG. 12B may be located at a height equal to or greater than the position 1202 shown in FIG. 12A.

FIGS. 13A and 13B illustrate diagrams for explaining movement of an object according to a friction force on a screen, according to an exemplary embodiment.

An object in a screen of the flexible device 200 may be included in a first area. The object may move based on outer form information about the flexible device 200. Additionally, a speed at which the object moves may be inversely proportional to a friction force on a part corresponding to the first area. For example, if a friction force on a part of the screen corresponding to an area in which the object moves is great, a lot of force may be needed to move the object. Accordingly, if a constant force is applied to the object, the object may move more and a speed at which the object moves may be greater in an area in which a friction force is small than in an area in which a friction force is great.

Respective outer shapes of the flexible device 200, shown in FIGS. 13A and 13B, are identical to each other. However, respective friction forces in parts of the screen, corresponding to areas of the screen in which the object moves, are different from each other. Since the respective friction forces are different from each other, even if respective balls start to move from a position 1301 at a same time point, the respective balls may arrive at positions different from each other.

In FIG. 13A, since a friction force is not present in an area where the ball moves, the ball may move only according to an outer form of the flexible device 200. The ball starts from the position 1301, and then, if a time period t1 elapses, the ball arrives at a position 1302. On the contrary, in FIG. 13B, since a friction force is present in an area where the ball moves, the ball may move according to an outer form of the flexible device 200 and a friction force applied to the flexible device 200. The ball starts from the position 1301, and then, if the time period t1 elapses, the ball arrives at a position 1303. In FIG. 13B, it takes longer than the time period t1 for the ball to arrive at the position 1302.

Additionally, an object in a screen of the flexible device 200 may move based on at least one selected from the group consisting of peripheral information about the object that is moving and a direction in which the object moves. The peripheral information may include sizes and a number of obstacles in an area in which the object moves. It may be obvious to one or ordinary skill in the art that the peripheral information may include all information about factors that may affect movement of the object in the screen.

As shown in FIG. 13B, a friction force in the screen may vary according to areas in which the object moves. Additionally, a size of an obstacle to movement of the object may vary according to areas in which the object moves. If a friction force is great or a size of an obstacle is large, it may take a long period of time for the object to move for a constant distance.

FIGS. 14A and 14B illustrate diagrams for explaining movement of an object according to a friction force in a screen, according to an exemplary embodiment.

Referring to FIGS. 14A and 14B, a bending area of the flexible device 200 and a degree to which the flexible device 200, shown in FIG. 14A, are identical to those shown in FIG. 14B. However, a friction force and a number of obstacles in a part, corresponding to an area of the screen in which an object moves, are different from those shown in FIG. 14B.

Referring to FIG. 14A, a ball in the screen may move based on an inclination of an area in which the ball is located. If the ball is present in a flat position, the ball does not move unless the ball receives a force. Since the ball is located in an inclined area, the ball may be affected by an inclination, and thus, move from an upward to downward direction. In this case, if a friction force is not present in the inclined area, the ball may be affected only the inclination, and move.

On the contrary, referring to FIG. 14B, a friction force is present in an inclined area. Additionally, since a friction force is not constant in an inclined area, a magnitude of a force received by a ball may be constantly changed. Since a friction force decreases a speed at which the ball moves, it may take a longer period of time for the ball to move a constant distance compared to a case when a friction force is not present.

Referring to FIGS. 14A and 14B, it is assumed that respective balls, shown in FIGS. 14A and 14B, start from a position 1401 and a time period t1 elapses. As shown in FIG. 14A, if a friction force is not present in an area, the ball arrives at a point 1402. As shown in FIG. 14B, if a friction force is present in an area, the ball arrives at a position 1403. The flexible device 200 may move an object in a screen, based on outer form information about the flexible device 200 and information about a screen of the flexible device 200. Here, the information about a screen includes a friction force in the screen, sizes and a number of obstacles, or the like, but is not limited thereto.

FIG. 15 illustrates a diagram for explaining a process of calculating an inclination of each bending area of the flexible device 200, according to an exemplary embodiment.

The flexible device 200 may be bent by an external force. A form in which the flexible device 200 may be bent may vary as described with reference to FIG. 6. A form in which the flexible device 200 is bent may be classified into an in-bending form and an out-bending form. As shown in FIG. 15, a bending area 1501 has an out-bending form, and a bending area 1502 is an in-bending form.

As shown in FIG. 15, the flexible device 200 may include a plurality of sensors. The plurality of sensors may correspond to at least one selected from the group consisting of a terrestrial magnetic sensor, a gyroscope sensor, an acceleration sensor, a bending sensor, a pressure sensor, a proximity sensor, and a grip sensor. In detail, the gyroscope sensor may detect a degree to which the flexible device 200 is inclined. The bending sensor may detect a direction of a force and a degree to which the flexible device 200 is inclined, by detecting a pressure intensity applied to the flexible device 200.

Referring to an example 1510 shown in FIG. 15, the sensor 210 may determine a degree to which the flexible device 200 is inclined, by using a 3D coordinate system. In detail, if a value of an x-axis is 0, since a magnitude of a normal force applied to an object is same as that of gravity in an area 1513, the area 1513 may be determined as a flat area. Additionally, since the bending area 1511 is an out-bending area, a direction of a force applied to an object may be determined as being inclined in a right downward direction. If a value of a pressure intensity is 80, a value of an inclination of an area 1514 may be determined as 80. Since the bending area 1512 is an in-bending area, a direction of a force applied to an object may be determined as being inclined in a right upward direction. If a value of a pressure intensity is 80, a value of an inclination of an area 1515 may be determined as 0.

Referring to an example 1520 shown in FIG. 15, if a value of an x-axis is 0, since a magnitude of a normal force applied to an object is same as that of gravity in an area 1523, the area 1523 may be determined as a flat area. Additionally, since the bending area 1521 is an out-bending area, a direction of a force applied to the object may be determined as being inclined in a right downward direction If a value of a pressure intensity is 40, a value of an inclination of an area 1524 may be determined as 40. Since a bending area 1522 is an in-bending area, a direction of a force applied to the object may be determined as being inclined in a right upward direction. If a value of a pressure intensity is 40, an inclination of an area 1525 may be determined as 0.

Likewise, referring to an example 1530 shown in FIG. 15, if a value of an x-axis is −20 and a value of a pressure intensity of bending areas 1531 and 1532 is 40, an area 1533 may be determined as being inclined in a right direction in correspondence with a value of 20, and an area 1535 may be determined as being inclined in a right direction in correspondence with a value of 20.

FIG. 16 illustrates a diagram for explaining a process of calculating an inclination of each bending area of the flexible device 200, according to another exemplary embodiment.

As shown in FIG. 16, bending areas are generated in the flexible device 200 by an external force. Bending areas 1601 and 1602 may be out-bending areas.

Referring to an example 1610 shown in FIG. 16, if a value of an x-axis is +80 and a value of a pressure intensity of bending areas 1611 and 1612 is 80, an area 1613 may be determined as being inclined in a left direction in correspondence with a value of 80, a value of an inclination of an area 1614 may be determined as 0, and an area 1615 may be determined as being inclined in a right direction in correspondence with a value of 80.

Referring to an example 1620 shown in FIG. 16, if a value of an x-axis is +80, a value of a pressure intensity of a bending area 1621 is 120, and a value of a pressure intensity of a bending area 1622 is 40, an area 1623 may be determined as being inclined in a left direction in correspondence with a value of 80, an area 1624 may be determined as being inclined in a right direction in correspondence with a value of 40, and an area 1625 may be determined as being inclined in a right direction in correspondence with a value of 80.

FIGS. 17A and 17B illustrate diagrams for explaining movement of an object in a screen according to a degree to which the flexible device 200 is bent, according to an exemplary embodiment.

Referring to FIGS. 17A and 17B, the flexible device 200, shown in FIG. 17A, is deformed by an external force to a degree different from a degree to which the flexible device 200 shown in FIG. 17B is deformed by an external force. A height of a tower shown in FIG. 17A is greater than that of a tower shown in FIG. 17B. If an object is dropped from a top of each of the towers in a screen, the flexible device 200 may provide a visual effect such that a period of time for which the object is dropped from the top of the tower, shown in FIG. 17A, is longer than that for which the object dropped from the top of the tower, shown in FIG. 17B, and a speed at which the object is dropped from the top of the tower in FIG. 17A is gradually increasing.

FIGS. 18A and 18B illustrate diagrams for explaining movement of an object in a screen according to a degree to which the flexible device 200 is bent, according to another exemplary embodiment.

According to an exemplary embodiment, a user may execute a bicycle racing game application by using the flexible device 200. When the flexible device 200 is bent, if a force applied to a bicycle in a screen of a game, executed by the bicycle racing game application, varies according to a degree to which the flexible device 200 is bent, the user may enjoy a lively game. A force applied to a bicycle in the game may vary according to a degree to which the flexible device 200 is bent, and/or a direction in which the flexible device 200 is bent, and/or a point at which the flexible device 200 is bent. A speed at which the bicycle moves in an ascent or a descent may vary according to an inclination of a slope.

Referring to an example 1810 shown in FIG. 18A, the sensor 120 may detect angle information in a 3D coordinate system by accumulating values of an angular velocity in the units of a predetermined time period, and detect a bending area. Referring to an example 1801 shown in FIG. 18A, the sensor 210 may detect an inclination formed from a left upper to a right lower direction, and detect a bending area present in a right lower part of the flexible device 200. If the bicycle in a screen of the flexible device 200 is heading toward a left upper part of the screen, a friction force may be applied to the bicycle in a right downward direction, based on outer form information about the flexible device 200 and information about a screen of the game that is being executed. In other words, the flexible device 200 may provide a visual effect such that, if an inclination is steep, it takes a long period of time for the bicycle to move a constant distance.

Referring to an example 1820 shown in FIG. 18B, the sensor 120 may detect angle information in a 3D coordinate system by accumulating values of an angular velocity in the units of a predetermined time period, and detect a bending area. Referring to an example 1802 shown in FIG. 18B, the sensor 210 may detect an inclination formed from a left lower to a right upper direction, and detect a bending area present in a left lower part of the flexible device 200. If the bicycle in the screen of the flexible device 200 is heading toward a right upper part of the screen, a friction force may be applied to the bicycle in a left downward direction based on outer form information about the flexible device 200 and information about a screen of the game that is being executed.

If a left lower part of a screen of the flexible device 200 is an in-bending area, and a value of an x-axis is a positive number, the flexible device 200 may be determined as being inclined in a left direction. If a value of the positive number is great, it may be determined that the flexible device 200 is inclined greatly in a left direction. The flexible device 200 may provide a visual effect such that the bicycle is moved toward a left part of the screen, based on outer form information about the flexible device 200 and information about a screen of the game that is being executed. Additionally, the flexible device 200 may provide a visual effect such that the bicycle is moved fast in a left direction if the flexible device 200 is inclined greatly in the left direction.

FIGS. 19A and 19B illustrate diagrams for explaining movement of an object in a screen according to a degree to which the flexible device 200 is bent, according to another exemplary embodiment.

According to an exemplary embodiment, an image in which a waterfall falls may be set as a wallpaper of a screen of the flexible device 200. Referring to FIGS. 19A and 19B, an inclination of an area 1910 of the flexible device 200 is steeper than that of an area 1920. In an actual natural environment, a waterfall in a steeply inclined area flows faster than a waterfall in a gently inclined area. Likewise, the flexible device 200 may control movement of an object in consideration of a degree to which the flexible device 200 is inclined. Since an inclination of the area 1910 is steeper than that of the area 1920, the flexible device 200 may provide a visual effect such that a waterfall flows faster and more wildly in the area 1910 than in the area 1920.

FIGS. 20A and 20B illustrate diagrams for explaining movement of an object in a screen according to a degree to which the flexible device 200 is bent, according to another exemplary embodiment.

According to an exemplary embodiment, a user may execute an application regarding a game of going down a waterfall by using the flexible device 200. The user may change an outer form of the flexible device 200 by applying an external force to the flexible device 200. The flexible device 200 may control the waterfall to flow based on information about the changed outer form of the flexible device 200. The user may input a signal for controlling a character rowing a boat and going down a waterfall via a user interface. As a detailed example, the user may input a touch signal by using a touch panel detecting a touch input.

Referring to FIGS. 20A and 20B, an inclination of the area 1910 of the flexible device 200 is steeper than that of the area 1920. If a same control signal is input to a character in a screen, the flexible device 200 may control movement of the character so that a distance for which the character goes down a waterfall in the area 1910 is longer than a distance for which the character goes down the waterfall in the area 1920.

FIG. 21 is a block diagram of a configuration of hardware of the flexible device, according to an exemplary embodiment.

Referring to FIG. 21, a flexible display apparatus 100 includes a display 110, a detector 120, a controller 130, a storage 140, an audio processor 150, a video processor 155, a communication unit 160, a global positioning system (GPS) receiving unit 165, a digital multimedia broadcasting (DMB) receiving unit 166, a graphic processor 170, a power supply unit 180, a speaker 185, a button 191, a universal serial bus (USB) port 192, a camera 193, and a microphone 194.

The display 110 may include a substrate, a driving unit, a display panel, and a protective layer. The substrate may be implemented as a plastic substrate (for example, a polymer film) that may be deformed by an external pressure. In detail, the plastic substrate has a structure such that barrier coating is performed on both sides of a base film. The base film may be implemented by using various types of resin such as polyimide (PI), polycarbonate (PC), Polyethylene terephtalate (PET), polyethersulfone (PES), polyethylene naphthalate (PEN), fiber reinforced plastic (FRP), or the like. Additionally, the barrier coating is performed on surfaces of a base film which face each other, and an organic layer or an inorganic layer may be used to perform barrier coating so as to maintain flexibility. Additionally, the substrate may employ a material having flexibility, such as thin glass or a metal foil.

A driving unit included in the display 110 drives a display. In detail, the driving unit applies a driving voltage to a plurality of pixels constituting the display, and may be implemented by using an amorphous silicon thin-film transistor (a-si TFT), a low temperature polysilicon (LTPS) TFT, an organic TFT (OTFT), or the like. The driving unit may be implemented in various forms according to an implementation type of a display panel. For example, the display panel may be formed of an organic light-emitting device (OLED) consisting of a plurality of pixel cells, and an electrode layer covering both sides of the OLED. In this case, the driving unit may include a plurality of transistors corresponding to each pixel cell of the display panel. The controller 130 applies an electrical signal to a gate included in each transistor so that pixel cells connected to each transistor emit light. Accordingly, an image may be displayed.

The display panel may be implemented as an electroluminescense (EL) display, an electrophoretic display (EPD), an electrochromic display (ECD), a liquid crystal display (LCD), an active-matrix LCD (AMLCD), or the like. However, since the LCD may not independently emit light, additional backlight is required. If the LCD does not employ backlight, ambient light is employed. Accordingly, a condition such as an outdoor environment, which may provide a large amount of light, needs to be met, so as to use an LCD panel without backlight.

The protective layer protects a display panel. For example, the protective layer may employ a material such as zirconium oxide (ZrO), cerium oxide (CeO2), thorium oxide (ThO2), or the like. The protective layer may be formed in a form of a transparent film, and cover a whole surface of the display panel.

If the display 110 is formed of a transparent material, the display 110 may be also implemented as a display apparatus that may be bent and has transparent characteristics. For example, if a substrate is implemented by using a polymer material such as transparent plastic, the driving unit is implemented by using a transparent transistor, and the display panel is implemented by using a transparent organic emission layer and a transparent electrode, the display 110 may have transparent characteristics.

The detector 120 may detect various user inputs such as a touch, a rotation, a movement, inclination, pressure, or the like, as well as deformation of the flexible display apparatus 100. The controller 130 may control an operation of the flexible display apparatus 100 by using various user inputs detected by the detector 120.

Referring to FIG. 21, the detector 120 includes a terrestrial magnetic sensor 121, a gyroscope sensor 122, an acceleration sensor 123, a touch sensor 124, a bending sensor 125, a pressure sensor 126, a proximity sensor 127, or a grip sensor 128.

The terrestrial magnetic sensor 120 is a sensor for detecting a state when the flexible display apparatus 100 is rotated, and a direction in which the flexible display apparatus 100 is moved.

The gyroscope sensor 122 is a sensor for detecting an angle at which the flexible display apparatus 100 is rotated. The flexible display apparatus 100 may include both the terrestrial magnetic sensor 121 and the gyroscope sensor 122. However, even if the flexible display apparatus 100 includes either the terrestrial magnetic sensor 121 or the gyroscope sensor 122, the flexible display apparatus 100 may detect a state when the flexible display apparatus 100 is rotated.

The acceleration sensor 123 is a sensor for detecting a degree to which the flexible display apparatus 100 is inclined. As described above, the terrestrial magnetic sensor 121, the gyroscope sensor 122, the acceleration sensor 123, or the like may be used to detect bending characteristics of the flexible display apparatus 100, such as a direction in which the flexible display apparatus 100 is bent, a bending area of the flexible display apparatus 100, or the like.

The touch sensor 124 may be implemented as a capacitive type or a resistive type. The capacitive type employs a method of detecting micro-electricity generated from a body of a user when a part of the body of the user touches a surface of the display 110 and calculating a coordinate of the touched location, by using a dielectric material coated on a surface of the display 110. The resistive type employs a method of detecting current flowing when, if a user touches a screen that includes two built-in electrode plates, an upper electrode plate and a lower electrode plate between the two built-in electrode plates contact each other at a touched location of the screen, and calculating a coordinate of the touched location of the screen. As described above, the touch sensor 124 may be implemented in various forms.

As described above, the bending sensor 125 may be implemented in various forms and amounts, and detect a state in which the flexible display apparatus 100 is bent. Various examples of a configuration and operation of the bending sensor 125 are described above. Thus, a description thereof is not provided here again.

The pressure sensor 125 detects a magnitude of a pressure, which is applied to the flexible display apparatus 100 when a user performs a touch or bending input, and provides the detected magnitude of the pressure to the controller 130. The pressure sensor 126 may include a piezo film that is included in the display 110 and outputs an electrical signal corresponding to a magnitude of a pressure.

In FIG. 21, the touch sensor 124 and the pressure sensor 126 are shown as separate elements. However, if the touch sensor 124 is implemented as a resistive type touch sensor, the resistive type touch sensor may also function as the pressure sensor 126.

The proximity sensor 127 is a sensor for detecting a motion that does not directly contact, but is near a surface of the display 110. The proximity sensor 127 may be implemented as various forms of sensor such as a high-frequency oscillation type for forming a high-frequency magnetic field, and thus, detecting current induced by magnetic characteristics that are changed when an object is near the proximity sensor 127, a magnetic type proximity sensor using a magnet, or an electrostatic-capacity proximity sensor for detecting electrostatic capacity that is changed when an object is near the electrostatic-capacity proximity sensor.

The grip sensor 128 is a sensor that is arranged at a border or a grip of the flexible display apparatus 100, separately from the pressure sensor 126, and detects a grip by a user. The grip sensor 128 may be implemented as a pressure sensor a touch sensor.

The controller 130 determines a user's intention by analyzing various detection signals detected by the detector 120, and performs an operation that matches the user's intention. Particularly, the controller 130 may recognize a bending and flat gesture and a bending and hold gesture so that the bending and flat gesture and the bending and holding gesture are distinguished from each other, and thus, may selectively perform a function corresponding to each gesture.

Additionally, the controller 130 may perform a control operation by using various input methods such as a touch operation, a motion input, a voice input, a button input, or the like, other than a bending gesture. A touch operation may include various operations such as a simple touch, a tap, a touch and hold, a movement, a flick, a drag and drop, a pinch-in operation, a pinch-out operation, or the like.

The controller 130 may execute an application stored in the storage 140, and thus, configure and display an execution screen of the application, or play various content stored in the storage 140. Additionally, the controller 130 may communicate with external devices via the communication unit 160.

The communication unit 160 may perform communication with various types of external devices according to various types of communication methods. The communication unit 160 may include various communication chips such as a WiFi chip 161, a Bluetooth chip 162, an NFC chip 163, a wireless communication chip 164, or the like.

The WiFi chip 161, the Bluetooth chip 162, and the NFC chip 173 respectively perform communication by using a WiFi method, a Bluetooth method, and an NFC method. The NFC chip 163 refers to a chip that operates according to the NFC method by using 13.56 MHz, from among various radio frequency identification (RFID) frequency bands such as 135 kHz, 13.56 MHz, 433 MHz, 860 to 960 MHz, 2.45 GHz, etc.

If the WiFi chip 161 or the Bluetooth chip 162 is employed, various connection information, such as a service set identifier (SSID), a session key, etc., is transceived in advance. Then, communication is performed by using the connection information so as to transceive various information. The wireless communication chip 164 refers to a chip for performing communication according to various communication standards such as institute of electrical and electronics engineers (IEEE), ZigBee, 3rd generation (3G), 3rd generation partnership project (3GPP), or long-term evolution (LTE).

The GPS receiver 165 may receive a GPS signal from a GPS satellite, and calculate a current location of the flexible display apparatus 100.

The DMB receiver 166 receives and processes a DMB signal.

The graphic processor generates a screen that includes various objects such as an icon, an image, text, or the like, by using an operation unit (not shown) and a rendering unit (not shown). The operation unit calculates an attribute value such as a coordinate value, a shape, a size, a color, or the like with respect to each object, according to a layout of the screen. The rendering unit may generate a screen having various types of layout that includes an object, based on the attribute value calculated by the operation unit. The screen generated by the rendering unit may be provided to the display 110, and displayed on an area of the display 110.

The power supply unit 180 supplies power to each element of the flexible display apparatus 100. The power supply unit 180 may be formed of an anode current collector, an anode electrode, an electrolyte, a cathode electrode, a cathode current collector, and a covering that covers the same. The power unit 180 is implemented as a secondary battery that may be charged or discharged. The power supply unit 180 may be implemented to have flexibility such that the power supply unit 180 may be bent with the flexible display apparatus 180. In this case, the anode and cathode current collectors, the anode and cathode electrodes, the electrolyte, and the covering included in the power supply unit 180 may be formed of a flexible material. A detailed form and material of the power supply unit 180 will be described later.

The audio processor 150 may process audio data. The audio processor 150 may perform various processings, such as decoding, amplification, or noise filtering, on the audio data.

The video processor 155 may process video data. The video processor 135 may perform various image processings, such as decoding, scaling, noise filtering, a frame rate conversion, or a resolution conversion, on the video data.

The audio processor 150 and the video processor 155 process and play multimedia content, a DMB broadcasting signal, or the like.

The display 110 displays a vide frame processed by the video processing unit 155, a screen generated by the graphic processor 170, or the like.

The speaker 185 outputs various notification sound or voice messages, as well as audio data processed by the audio processor 150.

The button 191 may be various types of button such as a mechanical button, a touch pad, a wheel, or the like, which is formed in an arbitrary area of the flexible display apparatus 100, such as a front surface, a side surface, or a rear surface of a main body of the flexible display apparatus 100.

The USB port 192 may communicate with various external apparatus via a USB cable.

The camera 193 captures a still image or moving images according to a control by a user.

The microphone 194 receives an input of user voice or other sound and converts the user voice or the other sound into audio data. The control unit 130 may use user voice, input via the microphone 194, for a phone call operation, or convert the user voice into audio data and store the user voice in the storage 140.

If the camera 193 and the microphone unit 194 are provided, the control unit 130 may perform control operation according to user voice input via the microphone unit 194 or a motion of a user recognized by the camera 193. In other words, the flexible display apparatus 100 may operate in a motion control mode or a voice control mode, as well as being deformed in a z-shape or controlled by a touch. If the flexible display apparatus 100 operates in the motion control mode, the controller 130 may activate the camera 193 to capture an image of a user, track a change in a motion of the user, and then, perform control operation corresponding to the change in the motion of the user. If the flexible display apparatus 100 operates in the voice control mode, the controller 130 may operate in a voice recognition mode in which user voice input via the microphone 194 is analyzed and a control operation is performed according to the analyzed user voice.

Additionally, the flexible display apparatus 100 may further include various input ports for connecting to various external terminals for a headset, a mouse, a LAN, or the like.

The operation by the controller 130, described above, may be performed by a program stored in the storage 140. The storage 140 may include operating (O/S) software for driving the flexible display apparatus 100, various applications, various data that is input or set while an application is executed, or various data such as content, bending gestures, bending interaction guide information, or the like.

For example, the storage 140 may store software that includes a sensing module (not shown), a communication module 143, a presentation module (not shown), or a service module (not shown).

For example, the sensing module (not shown) is a module for collecting information from various sensors included in the detector 120, and analyzing and managing the collected information. In detail, the sensing module is a program module performing an operation of detecting a manipulation attribute such as a coordinate value of a point at which a touch is performed, a direction in which a touch moves, a speed at which a touch moves, a distance for which a touch moves, or the like. Additionally, according to cases, the sensing module (not shown) may include a face recognition module, a voice recognition module, a motion recognition module, an NFC recognition module, or the like.

The presentation module (not shown) is a module for configuring a display screen. The presentation module (not shown) includes a multimedia module 144-1 for playing and outputting multimedia content, and a user interface (UI) rendering module 144-2 for performing UI and graphic processings. The multimedia module 144-1 may include a player module, a camcorder module, a sound processing module, or the like. Accordingly, the multimedia module 144-1 plays various multimedia content, and thus, generates and plays a screen and sound. The UI rendering module 144-2 may include an image compositor module for combining images with each other, a coordinate combination module for generating and combining coordinates in a screen, in which an image is to be displayed, with each other, an X11 module, a 2D/3D toolkit for providing a tool for configuring a UI in a 2D or 3D form, or the like.

The service module (not shown) is a module that includes various applications for, if the flexible display apparatus 100 is deformed or various types of user manipulations are performed, providing a service that matches the user manipulations. In detail, the service module (not shown) may include various program modules such as a navigation program module, a content playback program module, a game program module, an electronic book program module, a calendar program module, an alarm management program, a widget, or the like. Each program module may be used so that the program module matches various deformation states according to a bending and flap gesture, a bending and hold gesture, or the like.

The controller 130 controls all operations of the flexible display apparatus 100 by using various programs stored in the storage 140.

The controller 130 includes a random-access memory (RAM) 131, a read-only memory (ROM) 132, a timer 133, a main central processing unit (CPU) 134, first through nth interfaces 135-1 through 135-n, and a bus 136.

The RAM 131, the ROM 132, the timer 133, the main CPU 134, and the first through nth interfaces 135-1 through 135-n may be connected to each other via the bus 136.

The first through nth interfaces 135-1 through 135-n are connected to the above-described elements. One of the first through nth interfaces 135-1 through 135-n may be a network interface connected to an external apparatus via a network.

The main CPU 134 accesses the storage 140, and performs booting by using an OS stored in the storage 140. The main CPU 134 performs various operations by using various programs, content, or data stored in the storage 140.

The ROM 172 stores a command set for system booting. If a turn-on command is input and power is supplied to the flexible display apparatus 100, the main CPU 134 may copy the OS stored in the storage 140 to the RAM 131 according to a command stored in the ROM 132, and boot the system by executing the OS. When the booting is completed, the main CPU 134 copies various application programs stored in the storage 140 to the RAM 131, and executes the application programs copied to the RAM 131 so as to perform various operations.

If a detection signal corresponding to a state, in which the flexible display apparatus 100 is deformed, is received by the detector 120, the main CPU 134 stores in the storage 140 various information regarding an operation that has been performed until a time point when the detection signal was received, such as an application that was being executed or a function of the application, or a layout of a screen that was being displayed. Then, the main CPU 134 monitors whether a change in the detection signal is present. If the change in the detection signal is stopped, the main CPU 134 may calculate elapse of time by controlling the timer 133. Accordingly, if a predetermined period of time elapses in a state when the detection signal is not changed, the main CPU 134 determines a current gesture as a bending and hold gesture. On the contrary, if the detection signal is maintained for less than a predetermined period of time or is constantly changed, the main CPU 134 checks if characteristics of the state when the flexible display apparatus 100 is deformed match predetermined information. Accordingly, it may be determined whether a bending and flat gesture, general bending, folding, rolling, or the like has occurred.

If the determination is complete, the main CPU 134 checks information about a function that matches the gesture (the bending and flat gesture, the general bending, the folding, the rolling, or the like) from the storage 140, load an application for performing the function to the RAM 131, and then, execute the application.

FIG. 21 is a block diagram of a configuration of elements of the flexible display apparatus 100 when the flexible display apparatus 100 is, for example, an apparatus performing various functions such as a communication, a broadcasting receiving function, a moving image playback function, or the like. Accordingly, according to exemplary embodiments, a part of the elements, shown in FIG. 21, may not be provided in the flexible display apparatus 100 or may be changed, or other elements may be further included in the flexible display apparatus 100.

As described above, the controller 130 may perform various operations by executing a program stored in the storage 140.

The flexible display apparatus 100, described above, may be implemented by a hardware component, a software component, and/or a combination of a hardware element and a software element. For example, according to exemplary embodiments, the flexible display apparatus 100 and the elements thereof, described above, may be implemented by using one or more general-use computers or special purpose computers, like a processor, a controller, an arithmetic logic unit (ALU), a digital signal processor, a micro-computer, or an apparatus that may execute an instruction and respond to an instruction.

A processing apparatus may execute an OS or one or more software applications that are executed on the OS. Additionally, the processing apparatus may access, store, manipulate, process, and generate data, in response to execution of software.

For convenience of description, it is described that a processing apparatus is employed. However, it may be understood by one of ordinary skill in the art that the processing apparatus may include a plurality of processing elements and/or a plurality of types of processing elements. For example, the processing apparatus may include a plurality of processors, or a processor and a controller. Additionally, the processing apparatus may include other processing configurations such as a parallel processor.

Software may include a computer program, a code, an instruction, or one or more combinations thereof, and configure the processing apparatus or independently or collectively instruct the processing apparatus so that the processing apparatus operates as a user wants.

Software and/or data may be permanently or temporarily embodied in any type of machine, a component, a physical equipment, a virtual equipment, a computer storing medium or apparatus, or a transmitted signal wave, so that the software and/or data is interpreted by the processing apparatus or provides an instruction or data to the processing apparatus. Software may also be distributed over network coupled computer systems so that the software is stored and executed in a distributed fashion. The software and data may be stored in one or more computer-readable recording media.

According to exemplary embodiments, the method can be implemented in a form of executable program command through a variety of computer means recordable to computer-readable media. The computer-readable media may include solely or in combination, program commands, data files and data structures. The program commands recorded to the media may be components specially designed for the exemplary embodiments or may be usable to a skilled person in a field of computer software.

Computer-readable record media include magnetic media such as hard disk, floppy disk, or magnetic tape, optical media such as CD-ROM and DVD, magneto-optical media such as floptical disk and hardware devices such as ROM, RAM and flash memory specially designed to store and carry out programs.

Program commands include not only a machine language code made by a complier but also a high level code that can be used by an interpreter etc., which is executed by a computer.

The hardware device may be configured to operate as one or more software modules so as to perform an operation according to an exemplary embodiment, or vice versa.

Although exemplary embodiments are described with reference to the exemplary embodiments, described herein, and drawings, it may be understood by one of ordinary skill in the art that various changes and modifications thereof may be made. For example, even if the method may be performed differently from an order described herein, and/or the above-described elements such as a system, a structure, an apparatus are coupled or combined with each other by using a method different from the method described herein, or substituted or replaced by other elements or equivalents, an appropriate result may be obtained.

Therefore, the scope of exemplary embodiments is defined not by the detailed description of the exemplary embodiments, but by equivalents of the appended claims as well as the appended claims.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

The invention claimed is:

1. A flexible device comprising:
   a flexible display;
   a sensor configured to sense a bending of the flexible device; and
   at least one processor configured to:
      detect a first area in which an object displayed in a screen on the flexible display is located, from among the at least one area of the screen,
      determine outer form information associated with the first area of the flexible device, which the outer form information is obtained when the flexible device is deformed by the bending,
      based on a physical force corresponding to a touch input with respect to the flexible display, determine a magnitude of a virtual force that is applied to the object,
      determine peripheral information about the object comprising sizes of obstacles and a number of the obstacles in the first area, and
      control the flexible display to display the object to move from a first position in the screen to a second position in the screen, wherein the second position in the screen is determined based on the outer form information of the flexible device, the magnitude of the virtual force, and the peripheral information.

2. The flexible device of claim 1, wherein the at least one processor is further configured to:
   classify the screen into at least one area based on at least one bending area or at least one folding area, and
   control the object to be moved based on outer form information about the at least one area.

3. The flexible device of claim 1, wherein the flexible display is configured to display an image in which the object is moved based on the outer form information.

4. The flexible device of claim 1, wherein the at least one processor is further configured to:
control the object to be moved based on an inclination of the first area and a friction force on a part of the screen which corresponds to the first area.

5. The flexible device of claim 4, wherein a speed at which the object is moved in the first area by the at least one processor is proportional to the inclination of the first area, and inversely proportional to the friction force on the part of the screen which corresponds to the first area.

6. The flexible device of claim 4, wherein, if the inclination of the first area is different from an inclination of a second area of the at least one area, the at least one processor is further configured to control the speed at which the object is moved in the first area to be different from a speed at which the object is moved in the second area.

7. The flexible device of claim 4, wherein the at least one processor is further configured to control the object to be moved based on at least one selected from a group consisting of the peripheral information about the object that is moving, and a direction in which the object is moved.

8. The flexible device of claim 1, wherein the at least one processor is further configured to control the object to be moved in the screen, based on the input signal and the outer form information.

9. The flexible device of claim 2,
wherein the sensor is further configured to obtain physical information about the flexible device which is obtained when the flexible device is deformed by the at least one motion, and
wherein the at least one processor is further configured to determine outer form information about the at least one area based on the physical information.

10. The flexible device of claim 9, wherein the physical information comprises at least one selected from a group consisting of an angle at which the flexible device is bent, a curvature to which the flexible device is bent, an angle at which the flexible device is folded, and a curvature to which the flexible device is folded.

11. The flexible device of claim 2, wherein the sensor is comprised on a surface of the flexible display and bent as one body with the flexible display, and comprises a plurality of sensors.

12. A method of operating a flexible device, the method comprising:
detecting a first area in which an object displayed in a screen on the flexible display is located, from among the at least one area of the screen;
sensing at least one motion from a group consisting of a bending of the flexible device;
determining outer form information associated with the first area of the flexible device, which the outer formed information is obtained when the flexible device is deformed by the bending;
based on a physical force corresponding to a touch input with respect to a flexible display, determining a magnitude of a virtual force that is applied to the object;
determining peripheral information about the object comprising sizes of obstacles and a number of the obstacles in the first area; and
controlling the flexible display to display the object to move from a first position in the screen to a second position in the screen, wherein the second position in the screen is determined based on the outer form information of the flexible device, the magnitude of the virtual force, and the peripheral information.

13. The method of claim 12,
wherein the determining of the outer form information further comprises classifying the screen into at least one area based on at least one bending area or at least one folding area, and
wherein the controlling of the object to be moved comprises:
controlling the object to be moved based on an inclination of the first area and a friction force on a part of the screen which corresponds to the first area.

14. The flexible device of claim 1, wherein the determining of the outer form information comprises:
classifying a degree to which an outer form of the flexible device is deformed into a plurality of levels, and
matching a resistance value of the sensor within a certain range with each level.

15. The method of claim 12, wherein the determining of the outer form information comprises:
classifying a degree to which an outer form of the flexible device is deformed into a plurality of levels, and
matching a resistance value of the sensor within a certain range with each level.

* * * * *